(12) United States Patent
Wang et al.

(10) Patent No.: US 10,582,398 B2
(45) Date of Patent: *Mar. 3, 2020

(54) DATA EXCHANGE METHOD AND APPARATUS

(71) Applicant: Huawei Technologies Co., Ltd., Shenzhen (CN)

(72) Inventors: Yan Wang, Beijing (CN); Bo Lin, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/036,719

(22) Filed: Jul. 16, 2018

(65) Prior Publication Data

US 2018/0324608 A1    Nov. 8, 2018

Related U.S. Application Data

(63) Continuation of application No. 14/814,940, filed on Jul. 31, 2015, now Pat. No. 10,045,230, which is a (Continued)

(51) Int. Cl.
*H04L 12/28* (2006.01)
*H04W 24/02* (2009.01)
*H04W 92/06* (2009.01)
*H04W 76/10* (2018.01)
*H04W 76/12* (2018.01)
*H04W 92/20* (2009.01)

(52) U.S. Cl.
CPC ......... *H04W 24/02* (2013.01); *H04W 76/10* (2018.02); *H04W 76/12* (2018.02); *H04W 92/06* (2013.01); *H04W 92/20* (2013.01)

(58) Field of Classification Search
CPC ........................................................ H04L 12/28
USPC ........................................................ 370/328
See application file for complete search history.

(56) References Cited

U.S. PATENT DOCUMENTS

2010/0177736 A1    7/2010  Wang et al.
2010/0189075 A1    7/2010  Iwamura et al.
(Continued)

FOREIGN PATENT DOCUMENTS

CN    102025403 A    4/2011
CN    102378181 A    3/2012
(Continued)

OTHER PUBLICATIONS

Alcatel-Lucent Shanghai Bell et al.; "Service Information Exchange for MBMS Service Continuity"; 3GPP TSG-RAN WG3 #73bis; R3-112606; Zhuhai, China; Oct. 10-14, 2011; 4 pages.
(Continued)

*Primary Examiner* — Dang T Ton
(74) *Attorney, Agent, or Firm* — Conley Rose, P.C.

(57) ABSTRACT

The present invention relates to a data exchange method and apparatus. The method includes: sending, by a primary base station, a request of setting up an X3 interface to a secondary base station, wherein the X3 interface has a capability of bidirectional data communication; receiving, by the primary base station, a response of setting up the X3 interface sent by the secondary base station; and performing, by the primary base station, bidirectional data exchange with the secondary base station by using the X3 interface.

19 Claims, 11 Drawing Sheets

Related U.S. Application Data continuation of application No. PCT/CN2013/071263, filed on Feb. 1, 2013.

(56) References Cited

U.S. PATENT DOCUMENTS

| | | | |
|---|---|---|---|
| 2011/0075675 | A1 | 3/2011 | Koodli et al. |
| 2012/0099458 | A1 | 4/2012 | Ezaki et al. |
| 2012/0246325 | A1 | 9/2012 | Pancorbo Marcos et al. |
| 2013/0010754 | A1 | 1/2013 | Xu et al. |
| 2016/0021581 | A1 | 1/2016 | Deenoo et al. |
| 2018/0231944 | A1* | 8/2018 | Johnston ............ H04N 21/8106 |

FOREIGN PATENT DOCUMENTS

| | | |
|---|---|---|
| CN | 102651916 A | 8/2012 |
| WO | 2010086014 A1 | 8/2010 |

OTHER PUBLICATIONS

Email Discussion Rapporteur (NTT DOCOMO, Inc.); "Report of email discussion [66#22] on Relay architecture"; 3GPP TSG-RAN WG2 #66bis; R2-093972; Los Angeles, USA; Jun. 29-Jul. 3, 2009; R2-093972; 30 pages.

"3rd Generation Partnership Project; Technical Specification Group Radio Access Network; Evolved Universal Terrestrial Radio Access Network (E-UTRAN); X2 Application Protocol (X2AP)(Release 11)", 3GPP TS 36.423 V11.3.0, Dec. 2012, 141 pages.

"3rd Generation Partnership Project; Technical Specification Group Radio Access Network; Evolved Universal Terrestrial Radio Access Network (E-UTRAN); S1 Application Protocol (S1AP)(Release 11)", 3GPP TS 36.413 V11.2.0, Dec. 2012, 272 pages.

"Discussion of LTE O&M", Huawei, 3GPP TSG RAN WG3 Meeting #53bis, Oct. 10-13, 2006, 5 pages, R3-061464.

"Exchange of configuration information and parameter negotiation on X2", Alcatel-Lucent, 3GPP TSG-RAN WG3 Meeting #65bis, Oct. 12-15, 2009, 17 pages, R3-092437.

"Interface between relay peer-nodes in LTE-Advanced", Sharp, 3GPP TSG RAN WG1 Meeting #56, Feb. 9-13, 2009, 3 pages, R1-090698.

"3rd Generation Partnership Project; Technical Specification Group Radio Access Network; Evolved Universal Terrestrial Radio Access Network (E-UTRAN); X2 data transport (Release 11)", 3GPP TS 36.424 V11.0.0, Sep. 2012, 8 pages.

"Mobility Enhancment for Small Cell", ZTE Corporation, 3GPP TSG-RAN2 Meeting #81, Jan. 28-Feb. 1, 2013, 8 pages, R2-130135.

"Definition of Time to Wait IE in S1 and X2 Setup Failure message", Ericsson, 3GPP TSG-RAN WG3 #62, Nov. 10-14, 2008, 2 pages, R3-083314.

"Correction of Transport Layer address handling for S1/X2 signaling in DeNB", Huawei, 3GPP TSG-RAN WG3 #69 bis meeting, Oct. 11-15, 2010, 3 pages, R3-102651.

"Service Information Exchange for MBMS Service Continuity", Alcatel-Lucent Shanghai Bell, Alcatel-Lucent, 3GPP TSG-RAN WG3 Meeting #73, Aug. 22-26, 2011, 3 pages, R3-112116.

* cited by examiner

DATA EXCHANGE METHOD AND APPARATUS

CROSS-REFERENCE TO RELATED APPLICATIONS

This application is a continuation of U.S. patent application Ser. No. 14/814,940 filed on Jul. 31, 2015, which is a continuation of International Patent Application No. PCT/CN2013/071263 filed on Feb. 1, 2013, the disclosures of the aforementioned applications are hereby incorporated by reference in their entireties.

TECHNICAL FIELD

The present invention relates to the field of mobile communications, and in particular, to a data exchange method and apparatus.

BACKGROUND

With development of communications technologies and growing popularity of intelligent terminals, service traffic carried by wireless networks is growing rapidly. To meet such growth and improve experience of a user of a wireless terminal, a wireless network needs to provide a user with a higher bandwidth and a faster service rate.

For a Long Term Evolution (LTE) system, technologies such as coordinated multi-point transmission/reception (CoMP) and carrier aggregation (CA) are introduced in Release 10 and Release 11 to improve performance.

Topics such as inter-eNB CoMP (inter eNB CoMP), inter-evolved NodeB carrier aggregation (inter evolved NodeB CA, inter eNB CA), and small cell enhancement are further proposed in discussion of Release 12 of the 3rd Generation Partnership Project (3GPP), aiming to provide a user with better service quality.

In all the foregoing technologies, at least two base stations are required to serve same user equipment (User Equipment, UE), so as to increase a data exchange rate between UE and a network side. Therefore, how to implement that at least two base stations can simultaneously provide service for one piece of UE becomes an urgent-settling issue.

SUMMARY

In view of this, a data exchange method and apparatus are provided, so as to implement that at least two base stations work together to provide service for a same piece of UE.

According to a first aspect, a data exchange method is provided, and the method includes:

receiving, by a secondary base station, a first message sent by a primary base station, or receiving relationship information of a secondary base station and a primary base station configured by an operation, administration and maintenance system OAM, where the first message is used for notifying the secondary base station to set up an S1 interface;

sending, by the secondary base station, an S1 interface setup request to the primary base station;

receiving an S1 interface setup response sent by the primary base station; and performing, by the secondary base station, exchange with the primary base station by using the S1 interface.

In a first possible implementation manner of the first aspect, the first message carries an inter-eNB coordinated service identifier, the S1 interface setup request carries an inter-base station coordinated service identifier, and/or the S1 interface setup response carries an inter-base station coordinated service identifier.

According to one of the foregoing possible implementation manners, in a second possible implementation manner of the first aspect, preferably, the first message is sent by the primary base station after the primary base station receives the relationship information of the secondary base station and the primary base station from the OAM.

According to one of the foregoing possible implementation manners, in a third possible implementation manner of the first aspect, the method further includes: receiving, by the secondary base station, an Internet Protocol IP address and a tunnel endpoint identifier TEID of the primary base station that are sent by the primary base station; and the performing, by the secondary base station, exchange with the primary base station by using the S1 interface includes: sending, by the secondary base station to the primary base station, received uplink data sent by user equipment UE, so that the primary base station sends the uplink data to a serving gateway S-GW; and/or receiving, by the secondary base station, downlink data that is from the S-GW and is forwarded by the primary base station, and sending the downlink data to the UE.

According to one of the foregoing possible implementation manners, in a fourth possible implementation manner of the first aspect, after the receiving an S1 interface setup response sent by the primary base station, the method further includes: sending, by the secondary base station, a downlink transport network layer address TNL address and a General Packet Radio Service Tunneling Protocol tunnel endpoint identifier GTP TED of the secondary base station to the primary base station, so that the primary base station sends the downlink TNL address and the GTP TEID of the secondary base station to an S-GW by using a mobility management entity MME, and the secondary base station receives an uplink TNL address and a GTP TED of the S-GW that are sent by the primary base station; and the method further includes: sending, by the secondary base station to the S-GW, received uplink data sent by UE, and sending, by the secondary base station to the UE, received downlink data sent by the S-GW.

According to a second aspect, a data exchange method is provided, and the method includes:

sending, by a primary base station, a first message to a secondary base station, where the first message is used for notifying the secondary base station to set up an S1 interface;

receiving, by the primary base station, an S1 interface setup request sent by the secondary base station;

sending an S1 interface setup response to the secondary base station; and performing, by the primary base station, exchange with the secondary base station by using the S1 interface.

In a first possible implementation manner of the second aspect, the first message carries an inter-base station coordinated service identifier, the S1 interface setup request carries an inter-base station coordinated service identifier, and/or the S1 interface setup response carries an inter-base station coordinated service identifier.

According to one of the foregoing possible implementation manners, in a second possible implementation manner of the second aspect, the sending, by a primary base station, a first message to a secondary base station includes: receiving, by the primary base station, relationship information of the secondary base station and the primary base station from an operation, administration and maintenance system OAM, and sending the first message to the secondary base station.

According to one of the foregoing possible implementation manners, in a third possible implementation manner of the second aspect, the method further includes: sending, by the primary base station, an Internet Protocol IP address and a tunnel endpoint identifier TED of the primary base station to the secondary base station; and the performing, by the primary base station, exchange with the secondary base station by using the S1 interface includes: receiving, by the primary base station, uplink data that is from user equipment UE and is forwarded by the secondary base station, and sending, by the primary base station, the uplink data to a serving gateway S-GW; and/or forwarding, to the secondary base station, downlink data from the S-GW, so that the secondary base station sends the downlink data to the UE.

According to one of the foregoing possible implementation manners, in a fourth possible implementation manner of the second aspect, after the sending an S1 interface setup response to the secondary base station, the method further includes: sending, by the primary base station to an S-GW by using a mobility management entity MME, a received downlink transport network layer address TNL address and a received General Packet Radio Service Tunneling Protocol tunnel endpoint identifier GTP TEID of the secondary base station that are sent by the secondary base station, and sending, by the primary base station, an uplink TNL address and a GTP TEID of the S-GW to the secondary base station, so that the secondary base station sends, to the S-GW, received uplink data sent by UE, and sends, to the UE, received downlink data sent by the S-GW.

According to a third aspect, a data exchange method is provided, and the method includes:

sending, by a primary base station, an X2 handover request message to a secondary base station, where the X2 handover request message includes tunnel address information allocated by the primary base station to user equipment UE;

receiving, by the primary base station, an X2 handover request response sent by the secondary base station; and performing, by the primary base station, data exchange with the secondary base station by using an X2 interface.

In a first possible implementation manner of the third aspect, the tunnel address information includes: a transport network layer address TNL address and a General Packet Radio Service Tunneling Protocol tunnel endpoint identifier GTP TEID that are allocated by the primary base station to the UE.

According to one of the foregoing possible implementation manners, in a second possible implementation manner of the third aspect, the X2 handover request message carries an inter-base station coordinated service identifier; and/or the X2 handover request response carries an inter-base station coordinated service identifier.

According to one of the foregoing possible implementation manners, in a third possible implementation manner of the third aspect, the method further includes: updating or releasing, by the primary base station, an X2 interface association or a GTP tunnel related to the UE, and sending an update or release message to the secondary base station, so that the secondary base station updates or releases the X2 interface association or the General Packet Radio Service Tunneling Protocol GTP tunnel of the UE.

According to one of the foregoing possible implementation manners, in a fourth possible implementation manner of the third aspect, the update or release message carries the inter-base station coordinated service identifier and a bearer identifier.

According to a fourth aspect, a data exchange method is provided, and the method includes:

receiving, by a secondary base station, an X2 handover request message sent by a primary base station, where the X2 handover request message includes tunnel address information allocated by the primary base station to user equipment UE;

sending an X2 handover request response to the primary base station; and performing, by the secondary base station, data exchange with the primary base station by using an X2 interface.

In a first possible implementation manner of the fourth aspect, the tunnel address information includes: a transport network layer address TNL address and a General Packet Radio Service Tunneling Protocol tunnel endpoint identifier GTP TEID that are allocated by the primary base station to the UE.

According to one of the foregoing possible implementation manners, in a second possible implementation manner of the fourth aspect, the X2 handover request message carries an inter-base station coordinated service identifier; and/or the X2 handover request response carries an inter-base station coordinated service identifier.

According to one of the foregoing possible implementation manners, in a third possible implementation manner of the fourth aspect, the method further includes: receiving, by the secondary base station, an update or release message sent by the primary base station, and updating or releasing, by the secondary base station, an X2 interface association or a General Packet Radio Service Tunneling Protocol GTP tunnel of the UE.

According to one of the foregoing possible implementation manners, in a fourth possible implementation manner of the fourth aspect, the update or release message carries the inter-base station coordinated service identifier and a bearer identifier.

According to a fifth aspect, a data exchange method is provided, and the method includes:

sending, by a primary base station, a request of setting up an X3 interface to a secondary base station, where the X3 interface has a capability of bidirectional data communication;

receiving, by the primary base station, a response of setting up the X3 interface sent by the secondary base station; and performing, by the primary base station, bidirectional data exchange with the secondary base station by using the X3 interface.

In a first possible implementation manner of the fifth aspect, the request of setting up the X3 interface carries an inter-base station coordinated service identifier, and/or the response of setting up the X3 interface carries an inter-base station coordinated service identifier.

According to one of the foregoing possible implementation manners, in a second possible implementation manner of the fifth aspect, the X3 interface includes: an S1 interface.

According to one of the foregoing possible implementation manners, in a third possible implementation manner of the fifth aspect, the method further includes: sending, by the primary base station, an Internet Protocol IP address and a tunnel endpoint identifier TED of the primary base station to the secondary base station; and the performing, by the primary base station, bidirectional data exchange with the secondary base station by using the X3 interface includes:

receiving, by the primary base station, uplink data that is sent by user equipment UE and forwarded by the secondary base station, and sending the uplink data to a serving gateway S-GW; and sending, by the primary base station to the secondary base station, downlink data sent by the S-GW, so that the secondary base station sends the downlink data to the UE.

According to one of the foregoing possible implementation manners, in a fourth possible implementation manner of the fifth aspect, after the receiving, by the primary base station, a response of setting up the X3 interface sent by the secondary base station, the method further includes: sending, by the primary base station, a downlink transport network layer address TNL address and a General Packet Radio Service Tunneling Protocol tunnel endpoint identifier GTP TEID of the secondary base station to an S-GW by using a mobility management entity MME, and sending, by the primary base station, an uplink TNL address and a GTP TEID of the S-GW to the secondary base station, so that the secondary base station sends, to the S-GW, received uplink data sent by UE, and sends, to the UE, received downlink data sent by the S-GW.

According to a sixth aspect, a data exchange method is provided, the method including:

receiving, by a secondary base station, a request of setting up an X3 interface sent by a primary base station, where the X3 interface has a capability of bidirectional data communication;

sending, by the secondary base station, a response of setting up the X3 interface to the primary base station; and performing, by the secondary base station, bidirectional data exchange with the primary base station by using the X3 interface.

In a first possible implementation manner of the sixth aspect, the request of setting up the X3 interface carries an—inter base station coordinated service identifier, and/or the response of setting up the X3 interface carries an inter-base station coordinated service identifier.

According to one of the foregoing possible implementation manners, in a second possible implementation manner of the sixth aspect, the X3 interface includes: an S1 interface.

According to one of the foregoing possible implementation manners, in a third possible implementation manner of the sixth aspect, the method further includes: receiving, by the secondary base station, an Internet Protocol IP address and a tunnel endpoint identifier TEID of the primary base station that are sent by the primary base station; and the performing, by the secondary base station, bidirectional data exchange with the primary base station by using the X3 interface includes: sending, by the secondary base station to the primary base station, uplink data from user equipment UE, so that the primary base station sends the uplink data to a serving gateway S-GW; and receiving, by the secondary base station, downlink data that is from the S-GW and is sent by the primary base station, and sending the downlink data to the UE.

According to one of the foregoing possible implementation manners, in a fourth possible implementation manner of the sixth aspect, after the sending, by the secondary base station, a response of setting up the X3 interface to the primary base station, the method further includes: receiving, by the secondary base station, an uplink transport network layer address TNL address and a General Packet Radio Service Tunneling Protocol tunnel endpoint identifier GTP TED of an S-GW that are sent by the primary base station; sending, to the S-GW, received uplink data sent by UE; and sending, to the UE, received downlink data from the S-GW.

According to a seventh aspect, a data exchange method is provided, and the method includes:

receiving, by a mobility management entity MME, a first message sent by a primary base station, where the first message is used for requesting a secondary base station to collaborate with the primary base station to serve user equipment UE;

sending a second message to the secondary base station, where the second message is used for requesting the secondary base station to collaborate with the primary base station to serve the UE;

receiving a first response returned by the secondary base station, where the first response carries information that the secondary base station agrees to collaborate with the primary base station to serve the UE; and sending a second response to the primary base station, so that the primary base station and the secondary base station work together to serve the UE.

In a first possible implementation manner of the seventh aspect, after the receiving a first response returned by the secondary base station, the method further includes: notifying a serving gateway S-GW corresponding to the UE of address information of the secondary base station, and notifying the secondary base station of address information of the S-GW, so that the secondary base station performs data exchange with the S-GW for the UE.

According to one of the foregoing possible implementation manners, in a second possible implementation manner of the seventh aspect, the address information of the secondary base station includes: a transport network layer address TNL address and a General Packet Radio Service Tunneling Protocol tunnel endpoint identifier GTP-TEID of the secondary base station, and the address information of the S-GW includes: a TNL address and a GTP-TEID of the S-GW.

According to an eighth aspect, a data exchange method is provided, and the method includes:

receiving, by a secondary base station, a second message sent by a mobility management entity MME, where the second message is used for requesting the secondary base station to collaborate with a primary base station to serve user equipment UE; and sending, by the secondary base station, a first response to the MME, where the first response carries information that the secondary base station agrees to collaborate with the primary base station to serve the UE, so that the MME sends a second response to the primary base station, where the second response is used for notifying that the primary base station works together with the secondary base station to serve the UE.

In a first possible implementation manner of the eighth aspect, after the sending, by the secondary base station, a first response to the MME, the method further includes: receiving, by the secondary base station, address information, sent by the MME, of a serving gateway S-GW corresponding to the UE; and performing, by the secondary base station according to the address information of the S-GW, data exchange with the S-GW for the UE.

According to one of the foregoing possible implementation manners, in a second possible implementation manner of the eighth aspect, the address information of the S-GW includes: a transport network layer address TNL address and a General Packet Radio Service Tunneling Protocol tunnel endpoint identifier GTP-TEID of the S-GW.

According to one of the foregoing possible implementation manners, in a third possible implementation manner of the eighth aspect, the performing, by the secondary base station according to the address information of the S-GW, data exchange with the S-GW for the UE includes: sending, by the secondary base station to the S-GW, received uplink data from the UE, and sending, to the UE, received downlink data from the S-GW.

According to a ninth aspect, a data exchange apparatus is provided, where the apparatus is a secondary base station, and the apparatus includes: a receiving unit, a sending unit, and an exchange unit, where the receiving unit is configured to receive a first message sent by a primary base station, or receive relationship information of the secondary base station and a primary base station configured by an operation, administration and maintenance system OAM, where the first message is used for notifying the secondary base station to set up an S1 interface;

the sending unit is configured to send an S1 interface setup request to the primary base station;

the receiving unit is configured to receive an S1 interface setup response sent by the primary base station; and the exchange unit is configured to perform exchange with the primary base station by using the S1 interface.

In a first possible implementation manner of the ninth aspect, the first message carries an inter-base station coordinated service identifier, the S1 interface setup request carries an inter-base station coordinated service identifier, and/or the S1 interface setup response carries an inter-base station coordinated service identifier.

According to one of the foregoing possible implementation manners, in a second possible implementation manner of the ninth aspect, the first message is sent by the primary base station after the primary base station receives the relationship information of the secondary base station and the primary base station from the OAM.

According to one of the foregoing possible implementation manners, in a third possible implementation manner of the ninth aspect, the receiving unit is configured to receive an Internet Protocol IP address and a tunnel endpoint identifier TEID of the primary base station that are sent by the primary base station; and the exchange unit is configured to: send, to the primary base station, received uplink data sent by user equipment UE, so that the primary base station sends the uplink data to a serving gateway S-GW; and/or receive downlink data that is from the S-GW and is forwarded by the primary base station, and send the downlink data to the UE.

According to one of the foregoing possible implementation manners, in a fourth possible implementation manner of the ninth aspect, the sending unit is further configured to send a downlink transport network layer address TNL address and a General Packet Radio Service Tunneling Protocol tunnel endpoint identifier GTP TEID of the secondary base station to the primary base station, so that the primary base station sends the downlink TNL address and the GTP TEID of the secondary base station to an S-GW by using a mobility management entity MME, and the secondary base station receives an uplink TNL address and a GTP TEID of the S-GW that are sent by the primary base station; and the sending unit is further configured to send, to the S-GW, received uplink data sent by UE, and send, to the UE, received downlink data sent by the S-GW.

According to a tenth aspect, a data exchange apparatus is provided, where the apparatus is a primary base station, and the apparatus includes: a sending unit, a receiving unit, and an exchange unit, where the sending unit is configured to send a first message to a secondary base station, where the first message is used for notifying the secondary base station to set up an S1 interface;

the receiving unit is configured to receive an S1 interface setup request sent by the secondary base station;

the sending unit is further configured to send an S1 interface setup response to the secondary base station; and the exchange unit is configured to perform exchange with the secondary base station by using the S1 interface.

In a first possible implementation manner of the tenth aspect, the first message carries an inter base station coordinated service identifier, the S1 interface setup request carries an inter-base station coordinated service identifier, and/or the S1 interface setup response carries an inter-base station coordinated service identifier.

According to one of the foregoing possible implementation manners, in a second possible implementation manner of the tenth aspect, the receiving unit is further configured to receive relationship information of the secondary base station and the primary base station from an OAM, and the sending unit is further configured to send the first message to the secondary base station.

According to one of the foregoing possible implementation manners, in a third possible implementation manner of the tenth aspect, the sending unit is further configured to send an IP address and a TEID of the primary base station to the secondary base station; and the exchange unit is configured to: receive uplink data that is sent by the secondary base station and received from user equipment UE, and send the uplink data to an S-GW; and/or forward, to the secondary base station, downlink data from the S-GW, so that the secondary base station sends the downlink data to the UE.

According to one of the foregoing possible implementation manners, in a fourth possible implementation manner of the tenth aspect, the sending unit is further configured to send, to an S-GW by using an MME, a received downlink TNL address and a received GTP TEID of the secondary base station that are sent by the secondary base station, and send an uplink TNL address and a GTP TEID of the S-GW to the secondary base station, so that the secondary base station sends, to the S-GW, received uplink data sent by UE, and the secondary base station sends, to the UE, received downlink data sent by the S-GW.

According to an eleventh aspect, a data exchange apparatus is provided, where the apparatus is a primary base station, and the apparatus includes: a sending unit, a receiving unit, and an exchange unit, where the sending unit is configured to send an X2 handover request message to a secondary base station, where the X2 handover request message includes tunnel address information allocated by the primary base station to user equipment UE;

the receiving unit is configured to receive an X2 handover request response sent by the secondary base station; and the exchange unit is configured to perform data exchange with the secondary base station by using an X2 interface.

In a first possible implementation manner of the eleventh aspect, the tunnel address information includes: a transport network layer address TNL address and a General Packet Radio Service Tunneling Protocol tunnel endpoint identifier GTP TEID that are allocated by the primary base station to the UE.

According to one of the foregoing possible implementation manners, in a second possible implementation manner of the eleventh aspect, the X2 handover request message carries an inter-base station coordinated service identifier; and/or the X2 handover request response carries an inter-base station coordinated service identifier.

According to one of the foregoing possible implementation manners, in a third possible implementation manner of the eleventh aspect, the apparatus further includes: a control unit, configured to update or release an X2 interface association or a GTP tunnel related to the UE, and the sending unit is further configured to send an update or release message to the secondary base station, so that the secondary base station updates or releases the X2 interface association or the General Packet Radio Service Tunneling Protocol GTP tunnel of the UE.

According to one of the foregoing possible implementation manners, in a fourth possible implementation manner of the eleventh aspect, the update or release message carries the inter-base station coordinated service identifier and a bearer identifier.

According to a twelfth aspect, a data exchange apparatus is provided, where the apparatus is a secondary base station, and the apparatus includes: a receiving unit, a sending unit, and an exchange unit, where the receiving unit is configured to receive an X2 handover request message sent by a primary base station, where the X2 handover request message includes tunnel address information allocated by the primary base station to user equipment UE;

the sending unit is configured to send an X2 handover request response to the primary base station; and the exchange unit is configured to perform data exchange with the primary base station by using an X2 interface.

In a first possible implementation manner of the twelfth aspect, the tunnel address information includes: a transport network layer address TNL address and a General Packet Radio Service Tunneling Protocol tunnel endpoint identifier GTP TEID that are allocated by the primary base station to the UE.

According to one of the foregoing possible implementation manners, in a second possible implementation manner of the twelfth aspect, the X2 handover request message carries an inter-base station coordinated service identifier; and/or the X2 handover request response carries an inter-base station coordinated service identifier.

According to one of the foregoing possible implementation manners, in a third possible implementation manner of the twelfth aspect, the receiving unit is configured to receive an update or release message sent by the primary base station; and the apparatus further includes: a control unit, configured to update or release an X2 interface association or a General Packet Radio Service Tunneling Protocol GTP tunnel of the UE.

According to one of the foregoing possible implementation manners, in a fourth possible implementation manner of the twelfth aspect, the update or release message carries the inter-base station coordinated service identifier and a bearer identifier.

According to a thirteenth aspect, a data exchange apparatus is provided, where the apparatus is a primary base station, and the apparatus includes: a sending unit, a receiving unit, and an exchange unit, where the sending unit is configured to send a request of setting up an X3 interface to a secondary base station, where the X3 interface has a capability of bidirectional data communication;

the receiving unit is configured to receive a response of setting up the X3 interface sent by the secondary base station; and the exchange unit is configured to perform bidirectional data exchange with the secondary base station by using the X3 interface.

In a first possible implementation manner of the thirteenth aspect, the request of setting up the X3 interface carries an inter-base station coordinated service identifier, and/or the response of setting up the X3 interface carries an inter-base station coordinated service identifier.

According to one of the foregoing possible implementation manners, in a second possible implementation manner of the thirteenth aspect, the X3 interface includes: an S1 interface.

According to one of the foregoing possible implementation manners, in a third possible implementation manner of the thirteenth aspect, the sending unit is further configured to send an Internet Protocol IP address and a tunnel endpoint identifier TEID of the primary base station to the secondary base station; and the exchange unit is configured to: receive uplink data that is sent by user equipment UE and forwarded by the secondary base station, and send the uplink data to a serving gateway S-GW; and send, to the secondary base station, downlink data sent by the S-GW, so that the secondary base station sends the downlink data to the UE.

According to one of the foregoing possible implementation manners, in a fourth possible implementation manner of the thirteenth aspect, the sending unit is further configured to send a downlink transport network layer address TNL address and a General Packet Radio Service Tunneling Protocol tunnel endpoint identifier GTP TEID of the secondary base station to an S-GW by using an MME, and send an uplink TNL address and a GTP TEID of the S-GW to the secondary base station, so that the secondary base station sends, to the S-GW, received uplink data sent by UE, and sends, to the UE, received downlink data sent by the S-GW.

According to a fourteenth aspect, a data exchange apparatus is provided, where the apparatus is a secondary base station, and the apparatus includes: a receiving unit, a sending unit, and an exchange unit, where the receiving unit is configured to receive a request of setting up an X3 interface sent by a primary base station, where the X3 interface has a capability of bidirectional data communication;

the sending unit is configured to send a response of setting up the X3 interface to the primary base station; and the exchange unit is configured to perform bidirectional data exchange with the primary base station by using the X3 interface.

In a first possible implementation manner of the fourteenth aspect, the request of setting up the X3 interface carries an inter-base station coordinated service identifier, and/or the response of setting up the X3 interface carries an inter-base station coordinated service identifier.

According to one of the foregoing possible implementation manners, in a second possible implementation manner of the fourteenth aspect, the X3 interface includes: an S1 interface.

According to one of the foregoing possible implementation manners, in a third possible implementation manner of the fourteenth aspect, the receiving unit is further configured to receive an Internet Protocol IP address and a tunnel endpoint identifier TEID of the primary base station that are sent by the primary base station; the exchange unit is configured to send, to the primary base station, uplink data sent from user equipment UE, so that the primary base station sends the uplink data to a serving gateway S-GW; and the secondary base station receives downlink data that is sent by the primary base station and is from the S-GW, and sends the downlink data to the UE.

According to one of the foregoing possible implementation manners, in a fourth possible implementation manner of the fourteenth aspect, the exchange unit is further configured to: receive an uplink transport network layer address TNL address and a General Packet Radio Service Tunneling Protocol tunnel endpoint identifier GTP TEID of an S-GW that are sent by the primary base station; send, to the S-GW, received uplink data sent by UE; and send, to the UE, received downlink data from the S-GW.

According to a fifteenth aspect, a data exchange apparatus is provided, where the apparatus is a mobility management entity MME, and the apparatus includes: a receiving unit and a sending unit, where the receiving unit is configured to receive a first message sent by a primary base station, where the first message is used for requesting a secondary base station to collaborate with the primary base station to serve user equipment UE;

the sending unit is configured to send a second message to the secondary base station, where the second message is used for requesting the secondary base station to collaborate with the primary base station to serve the UE;

the receiving unit is further configured to receive a first response returned by the secondary base station, where the first response carries information that the secondary base station agrees to collaborate with the primary base station to serve the UE; and the sending unit is further configured to send a second response to the primary base station, so that the primary base station and the secondary base station work together to serve the UE.

In a first possible implementation manner of the fifteenth aspect, the sending unit is further configured to notify a serving gateway S-GW corresponding to the UE of address information of the secondary base station, and notify the secondary base station of address information of the S-GW, so that the secondary base station performs data exchange with the S-GW for the UE.

According to one of the foregoing possible implementation manners, in a second possible implementation manner of the fifteenth aspect, the address information of the secondary base station includes: a transport network layer address TNL address and a General Packet Radio Service Tunneling Protocol tunnel endpoint identifier GTP-TEID of the secondary base station, and the address information of the S-GW includes: a TNL address and a GTP-TEID of the S-GW.

According to a sixteenth aspect, a data exchange apparatus is provided, where the apparatus is a secondary base station, and the apparatus includes: a receiving unit and a sending unit, where the receiving unit is configured to receive a second message sent by a mobility management entity MME, where the second message is used for requesting the secondary base station to collaborate with a primary base station to serve user equipment UE; and the sending unit is configured to send a first response to the MME, where the first response carries information that the secondary base station agrees to collaborate with the primary base station to serve the UE, so that the MME sends a second response to the primary base station, where the second response is used for notifying that the primary base station works together with the secondary base station to serve the UE.

In a first possible implementation manner of the sixteenth aspect, the receiving unit is further configured to receive address information, sent by the MME, of a serving gateway S-GW corresponding to the UE; and the apparatus further includes an exchange unit, configured to perform, according to the address information of the S-GW, data exchange with the S-GW for the UE.

According to one of the foregoing possible implementation manners, in a second possible implementation manner of the sixteenth aspect, the address information of the S-GW includes: a transport network layer address TNL address and a General Packet Radio Service Tunneling Protocol tunnel endpoint identifier GTP-TEID of the S-GW.

According to one of the foregoing possible implementation manners, in a third possible implementation manner of the sixteenth aspect, the exchange unit is further configured to send, to the S-GW, received uplink data from the UE, and send, to the UE, received downlink data from the S-GW.

According to a seventeenth aspect, a data exchange apparatus is provided, where the apparatus is a secondary base station, and the apparatus includes:
    a network interface;
    a processor;
    a memory; and
    an application program stored in the memory, where the application program includes:
    an instruction used for receiving a first message sent by a primary base station, or receiving relationship information of the secondary base station and a primary base station configured by an operation, administration and maintenance system OAM, where the first message is used for notifying the secondary base station to set up an S1 interface;
    an instruction used for sending an S1 interface setup request to the primary base station;
    an instruction used for receiving an S1 interface setup response sent by the primary base station; and
    an instruction used for performing exchange with the primary base station by using the S1 interface; and
    the processor is configured to execute the application program.

In a first possible implementation manner of the seventeenth aspect, the first message carries an inter-base station coordinated service identifier, the S1 interface setup request carries an inter-base station coordinated service identifier, and/or the S1 interface setup response carries an inter-base station coordinated service identifier.

According to one of the foregoing possible implementation manners, in a second possible implementation manner of the seventeenth aspect, the first message is sent by the primary base station after the primary base station receives the relationship information of the secondary base station and the primary base station from the OAM.

According to one of the foregoing possible implementation manners, in a third possible implementation manner of the seventeenth aspect, the application program further includes: an instruction used for receiving an Internet Protocol IP address and a tunnel endpoint identifier TEID of the primary base station that are sent by the primary base station; and the instruction used for performing exchange with the primary base station by using the S1 interface includes: an instruction used for sending, to the primary base station, received uplink data sent by user equipment UE, so that the primary base station sends the uplink data to an S-GW; and/or an instruction used for receiving downlink data that is from the S-GW and is forwarded by the primary base station, and sending the downlink data to the UE.

According to one of the foregoing possible implementation manners, in a fourth possible implementation manner of the seventeenth aspect, the application program further includes: an instruction used for sending a downlink transport network layer address TNL address and a General Packet Radio Service Tunneling Protocol tunnel endpoint identifier GTP TEID of the secondary base station to the primary base station, so that the primary base station sends the downlink TNL address and the GTP TEID of the secondary base station to an S-GW by using an MME, and an instruction used for receiving an uplink TNL address and a GTP TEID of the S-GW that are sent by the primary base station; and the application program further includes: an instruction used for sending, to the S-GW, received uplink data sent by UE, and sending, to the UE, received downlink data sent by the S-GW.

According to an eighteenth aspect, a data exchange apparatus is provided, where the apparatus is a primary base station, and the apparatus includes:
a network interface;
a processor;
a memory; and
an application program stored in the memory, where the application program includes:
an instruction used for sending a first message to a secondary base station, where the first message is used for notifying the secondary base station to set up an S1 interface;
an instruction used for receiving an S1 interface setup request sent by the secondary base station;
an instruction used for sending an S1 interface setup response to the secondary base station; and
an instruction used for performing exchange with the secondary base station by using the S1 interface; and
the processor is configured to execute the application program.

In a first possible implementation manner of the eighteenth aspect, the first message carries an inter-base station coordinated service identifier, the S1 interface setup request carries an inter-base station coordinated service identifier, and/or the S1 interface setup response carries an inter-base station coordinated service identifier.

According to one of the foregoing possible implementation manners, in a second possible implementation manner of the eighteenth aspect, the instruction used for sending a first message to a secondary base station includes: an instruction used for receiving relationship information of the secondary base station and the primary base station from an OAM, and an instruction used for sending the first message to the secondary base station.

According to one of the foregoing possible implementation manners, in a third possible implementation manner of the eighteenth aspect, the application program further includes: an instruction used for sending an Internet Protocol IP address and a tunnel endpoint identifier TEID of the primary base station to the secondary base station; and the instruction used for performing exchange with the secondary base station by using the S1 interface includes: an instruction used for receiving uplink data that is sent by the secondary base station and received from user equipment UE, and an instruction used for sending the uplink data to an S-GW; and/or an instruction used for forward, to the secondary base station, downlink data from the S-GW, so that the secondary base station sends the downlink data to the UE.

According to one of the foregoing possible implementation manners, in a fourth possible implementation manner of the eighteenth aspect, the application program further includes: an instruction used for sending, to an S-GW by using an MME, a received downlink TNL address and a received GTP TEID of the secondary base station that are sent by the secondary base station, and an instruction used for sending an uplink TNL address and a GTP TEID of the S-GW to the secondary base station, so that the secondary base station sends, to the S-GW, received uplink data sent by UE, and the secondary base station sends, to the UE, received downlink data sent by the S-GW.

According to a nineteenth aspect, a data exchange apparatus is provided, where the apparatus is a primary base station, and the apparatus includes:
a network interface;
a processor;
a memory; and
an application program stored in the memory, where the application program includes:
an instruction used for sending an X2 handover request message to a secondary base station, where the X2 handover request message includes tunnel address information allocated by the primary base station to user equipment UE;
an instruction used for receiving an X2 handover request response sent by the secondary base station; and
an instruction used for performing data exchange with the secondary base station by using an X2 interface; and
the processor is configured to execute the application program.

In a first possible implementation manner of the nineteenth aspect, the tunnel address information includes: a transport network layer address TNL address and a General Packet Radio Service Tunneling Protocol tunnel endpoint identifier GTP TEID that are allocated by the primary base station to the UE.

According to one of the foregoing possible implementation manners, in a second possible implementation manner of the nineteenth aspect, the X2 handover request message carries an inter-base station coordinated service identifier; and/or the X2 handover request response carries an inter-base station coordinated service identifier.

According to one of the foregoing possible implementation manners, in a third possible implementation manner of the nineteenth aspect, the application program further includes: an instruction used for updating or releasing an X2 interface association or a GTP tunnel related to the UE, and sending an update or release message to the secondary base station, so that the secondary base station updates or releases the X2 interface association or the General Packet Radio Service Tunneling Protocol GTP tunnel of the UE.

According to one of the foregoing possible implementation manners, in a fourth possible implementation manner of the nineteenth aspect, the update or release message carries the inter-base station coordinated service identifier and a bearer identifier.

According to a twentieth aspect, a data exchange apparatus is provided, where the apparatus is a secondary base station, and the apparatus includes:
a network interface;
a processor;
a memory; and
an application program stored in the memory, where the application program includes:
an instruction used for receiving an X2 handover request message sent by a primary base station, where the X2 handover request message includes tunnel address information allocated by the primary base station to user equipment UE;
an instruction used for sending an X2 handover request response to the primary base station; and an instruction used for performing data exchange with the primary base station by using an X2 interface; and the processor is configured to execute the application program.

In a first possible implementation manner of the twentieth aspect, the tunnel address information includes: a transport network layer address TNL address and a General Packet Radio Service Tunneling Protocol tunnel endpoint identifier GTP TEID that are allocated by the primary base station to the UE.

According to one of the foregoing possible implementation manners, in a second possible implementation manner of the twentieth aspect, the X2 handover request message carries an inter-base station coordinated service identifier; and/or the X2 handover request response carries an inter-base station coordinated service identifier.

According to one of the foregoing possible implementation manners, in a third possible implementation manner of the twentieth aspect, the application program further includes: an instruction used for receiving an update or release message sent by the primary base station, and updating or releasing an X2 interface association or a General Packet Radio Service Tunneling Protocol GTP tunnel of the UE.

According to one of the foregoing possible implementation manners, in a fourth possible implementation manner of the twentieth aspect, the update or release message carries the inter-base station coordinated service identifier and a bearer identifier.

According to a twenty-first aspect, a data exchange apparatus is provided, where the apparatus is a primary base station, and the apparatus includes:

a network interface;
a processor;
a memory; and
an application program stored in the memory, where the application program includes:
an instruction used for sending a request of setting up an X3 interface to a secondary base station, where the X3 interface has a capability of bidirectional data communication;
an instruction used for receiving a response of setting up the X3 interface sent by the secondary base station; and
an instruction used for performing bidirectional data exchange with the secondary base station by using the X3 interface; and
the processor is configured to execute the application program.

In a first possible implementation manner of the twenty-first aspect, the request of setting up the X3 interface carries an inter-base station coordinated service identifier, and/or the response of setting up the X3 interface carries an inter-base station coordinated service identifier.

According to one of the foregoing possible implementation manners, in a second possible implementation manner of the twenty-first aspect, the X3 interface includes: an S1 interface.

According to one of the foregoing possible implementation manners, in a third possible implementation manner of the twenty-first aspect, the application program further includes: an instruction used for sending an Internet Protocol IP address and a tunnel endpoint identifier TEID of the primary base station to the secondary base station; and the instruction used for performing bidirectional data exchange with the secondary base station by using the X3 interface includes: an instruction used for receiving uplink data that is sent by user equipment UE and forwarded by the secondary base station, and sending the uplink data to a serving gateway S-GW; and an instruction used for sending, to the secondary base station, downlink data sent by the S-GW, so that the secondary base station sends the downlink data to the UE.

According to one of the foregoing possible implementation manners, in a fourth possible implementation manner of the twenty-first aspect, the application program further includes: an instruction used for sending, after the primary base station receives the response of setting up the X3 interface sent by the secondary base station, a downlink transport network layer address TNL address and a General Packet Radio Service Tunneling Protocol tunnel endpoint identifier GTP TEID of the secondary base station to an S-GW by using a mobility management entity MME, and an instruction used for sending an uplink TNL address and a GTP TEID of the S-GW to the secondary base station, so that the secondary base station sends, to the S-GW, received uplink data sent by UE, and an instruction used for sending, to the UE, received downlink data sent by the S-GW.

In a twenty-second aspect, a data exchange apparatus is provided, where the apparatus is a secondary base station, and the apparatus includes:

a network interface;
a processor;
a memory; and
an application program stored in the memory, where the application program includes:
an instruction used for receiving a request of setting up an X3 interface sent by a primary base station, where the X3 interface has a capability of bidirectional data communication;
an instruction used for sending a response of setting up the X3 interface to the primary base station; and
an instruction used for performing bidirectional data exchange with the primary base station by using the X3 interface; and
the processor is configured to execute the application program.

In a first possible implementation manner of the twenty-second aspect, the request of setting up the X3 interface carries an inter-base station coordinated service identifier, and/or the response of setting up the X3 interface carries an inter-base station coordinated service identifier.

According to one of the foregoing possible implementation manners, in a second possible implementation manner of the twenty-second aspect, the X3 interface includes: an S1 interface.

According to one of the foregoing possible implementation manners, in a third possible implementation manner of the twenty-second aspect, the application program further includes: an instruction used for receiving an Internet Protocol IP address and a tunnel endpoint identifier TEID of the primary base station that are sent by the primary base station; and the instruction used for performing bidirectional data exchange with the primary base station by using the X3 interface includes: an instruction used for sending, to the primary base station, uplink data from user equipment UE, so that the primary base station sends the uplink data to a serving gateway S-GW; and an instruction used for receiving downlink data that is from the S-GW and is sent by the primary base station, and sending the downlink data to the UE.

According to one of the foregoing possible implementation manners, in a fourth possible implementation manner of the twenty-second aspect, the application program further includes: an instruction used for receiving an uplink transport network layer address TNL address and a General Packet Radio Service Tunneling Protocol tunnel endpoint identifier GTP TEID of an S-GW that are sent by the primary base station, sending, to the S-GW, received uplink data sent by UE, and sending, to the UE, received downlink data from the S-GW.

According to a twenty-third aspect, a data exchange apparatus is provided, where the apparatus is a mobility management entity MME, and the apparatus includes:
  a network interface;
  a processor;
  a memory; and
  an application program stored in the memory, where the application program includes:
    an instruction used for receiving a first message sent by a primary base station, where the first message is used for requesting a secondary base station to collaborate with the primary base station to serve user equipment UE;
    an instruction used for sending a second message to the secondary base station, where the second message is used for requesting the secondary base station to collaborate with the primary base station to serve the UE;
    an instruction used for receiving a first response returned by the secondary base station, where the first response carries information that the secondary base station agrees to collaborate with the primary base station to serve the UE; and
    an instruction used for sending a second response to the primary base station, so that the primary base station and the secondary base station work together to serve the UE; and
  the processor is configured to execute the application program.

In a first possible implementation manner of the twenty-third aspect, the application program further includes: an instruction used for notifying a serving gateway S-GW corresponding to the UE of address information of the secondary base station, and notifying the secondary base station of address information of the S-GW, so that the secondary base station performs data exchange with the S-GW for the UE.

According to one of the foregoing possible implementation manners, in a second possible implementation manner of the twenty-third aspect, the address information of the secondary base station includes: a transport network layer address TNL address and a General Packet Radio Service Tunneling Protocol tunnel endpoint identifier GTP-TEID of the secondary base station, and the address information of the S-GW includes: a TNL address and a GTP-TEID of the S-GW.

According to a twenty-fourth aspect, a data exchange apparatus is provided, where the apparatus is a secondary base station, and the apparatus includes:
  a network interface;
  a processor;
  a memory; and
  an application program stored in the memory, where the application program includes:
    an instruction used for receiving a second message sent by a mobility management entity MME, where the second message is used for requesting the secondary base station to collaborate with a primary base station to serve user equipment UE; and
    an instruction used for sending a first response to the MME, where the first response carries information that the secondary base station agrees to collaborate with the primary base station to serve the UE, so that the MME sends a second response to the primary base station, where the second response is used for notifying that the primary base station works together with the secondary base station to serve the UE; and
  the processor is configured to execute the application program.

In a first possible implementation manner of the twenty-fourth aspect, after the secondary base station sends the first response to the MME, the application program further includes: an instruction used for receiving address information, sent by the MME, of a serving gateway S-GW corresponding to the UE; and an instruction used for performing, according to the address information of the S-GW, data exchange with the S-GW for the UE.

According to one of the foregoing possible implementation manners, in a second possible implementation manner of the twenty-fourth aspect, the address information of the S-GW includes: a transport network layer address TNL address and a General Packet Radio Service Tunneling Protocol tunnel endpoint identifier GTP-TEID of the S-GW.

According to one of the foregoing possible implementation manners, in a third possible implementation manner of the twenty-fourth aspect, the instruction used for performing, according to the address information of the S-GW, data exchange with the S-GW for the UE includes: an instruction used for sending, to the S-GW, received uplink data from the UE, and sending, to the UE, received downlink data from the S-GW.

For the data exchange method and apparatus in the embodiments of the present invention, an S1, X2 or X3 interface between a primary base station and a secondary base station may be used to perform, or a secondary base station may be used to directly perform, data transmission with an S-GW, thereby implementing data exchange between the primary base station and the secondary base station; coordinated data transmission is performed, and the primary base station may perform bidirectional data transmission with the secondary base station, thereby improving service quality for UE.

DETAILED DESCRIPTION

The technical solutions of the present invention are further described below in detail with reference to the accompanying drawings and embodiments.

In the embodiments of the present invention, a base station eNB1 and a base station eNB2 may work together to serve UE, where eNB1 is a primary serving base station, and eNB2 is a secondary serving base station, or may also be referred to as a secondary base station, a coordinating base station, a small cell node, a low power node, a relay station, a home base station, a small-cell base station, a micro base station, a pico base station, a macro base station, or the like. In the embodiments of the present invention, there may be one secondary base station, or there may be multiple secondary base stations.

Figure 1:
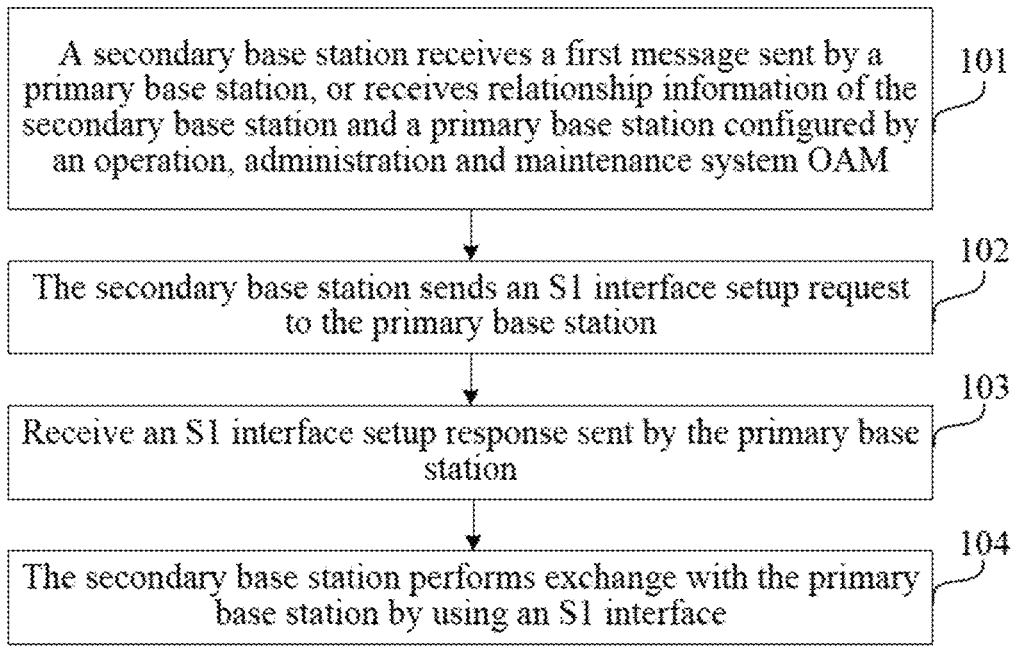
FIG. 1 is a flowchart of a data exchange method according to a first embodiment of the present invention.
Figure 2:
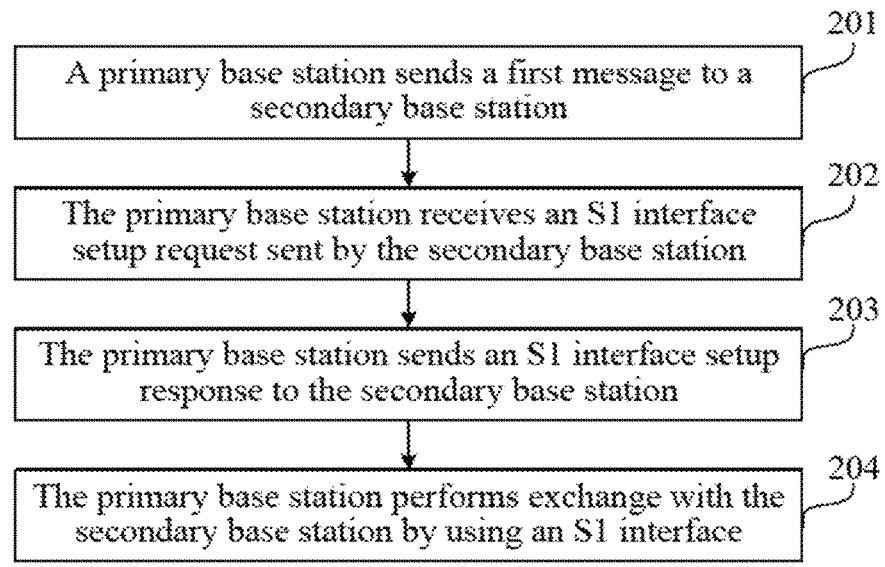
FIG. 2 is a flowchart of a data exchange method according to a second embodiment of the present invention.

FIG. 1 and FIG. 2 are flowcharts of data exchange methods according to a first embodiment and a second embodiment of the present invention. The first embodiment illustrates a processing process of a primary base station, and the second embodiment illustrates a processing process of a secondary base station. The primary base station and the secondary base station in the first embodiment and the second embodiment perform exchange by using an S1 interface.

FIG. 1 is a flowchart of a data exchange method according to the first embodiment of the present invention. As shown in the figure, the method in this embodiment includes the following steps:

Step 101: A secondary base station receives a first message sent by a primary base station, or receives relationship information of the secondary base station and a primary base station configured by an operation, administration and maintenance system, where the first message is used for notifying the secondary base station to set up an S1 interface.

For example, a primary base station eNB1 expects to set up the S1 interface with a secondary base station eNB2, from the perspective of the secondary base station eNB2, the primary base station eNB1 is considered as a special core network node, and therefore, the primary base station eNB1 may perform UE context management and bearer management on the secondary base station eNB2. For example, UE context management and bearer management procedures in 3GPP TS 36.413 of the S1AP protocol are used between the primary base station eNB1 and the secondary base station eNB2.

Optionally, the S1 interface is an S1 interface used for an inter-base station coordinated service, and an S1 interface setup requirement S1 SETUP REQUIRED/INVOKE message carries an inter-base station coordinated service identifier. For example, a field for recording a name in the S1 interface setup requirement includes information about an inter-base station coordinated service.

The inter-base station coordinated service may be inter-base station coordinated transmission, inter-base station CoMP, inter-base station carrier aggregation, an inter-base station multiflow service, or the like.

In this step, the primary base station eNB1 sends the S1 interface setup requirement to the secondary base station eNB2, so that the secondary base station eNB2 learns that the primary base station eNB1 expects to set up the S1 interface with the secondary base station eNB2. The secondary base station eNB2 may learn that, in other manners, the primary base station eNB1 expects to set up the S1 interface with the secondary base station eNB2. For example:

The operation, administration and maintenance system (OAM) sends the relationship information configured by the OAM to the primary base station and/or the secondary base station; and/or the S1 interface setup requirement carries an inter-base station coordinated service identifier.

The relationship information is a corresponding relationship between a primary base station and a secondary base station, or a corresponding relationship between a controlling node and a controlled node.

Step 102: The secondary base station sends an S1 interface setup request to the primary base station.

For example, after receiving the S1 interface setup requirement, or receiving the relationship information sent by the OAM, the secondary base station eNB2 learns that the primary base station eNB1 needs the secondary base station eNB2 to request to assist the primary base station eNB1 in serving UE. If the secondary base station eNB2 agrees, the secondary base station eNB2 sends the S1 interface setup request S1 SETUP REQUEST message to the primary base station eNB1. The setup request is sent from the secondary base station eNB2 to the primary base station eNB1, and may carry an inter-base station coordinated service identifier.

Step 103: Receive an S1 interface setup response sent by the primary base station.

If the primary base station eNB1 allows the S1 interface setup, the primary base station eNB1 sends the S1 interface setup response S1 SETUP RESPONSE message to the secondary base station, where the message may carry an inter-base station coordinated service identifier. If the primary base station eNB1 does not allow the S1 interface setup, the primary base station eNB1 returns an S1 setup failure S1 SETUP FAILURE message to the secondary base station.

Step 104: The secondary base station performs exchange with the primary base station by using the S1 interface. For example, an S1 interface connection is set up between the secondary base station and the primary base station, and data exchange is performed by using the S1 interface.

The S1 interface is set up between the primary base station eNB1 and the secondary base station eNB2, and subsequently functions of UE context management and bearer management are reused to implement an inter-base station coordinated transmission service. From the perspective of the UE, the S1 interface of the UE may be connected to a mobility management entity (MME) by using eNB1. In the prior art, eNB2 does not directly exchange information about the UE with a serving MME of the UE. In this embodiment, eNB2 can be connected to the serving MME of the UE by using the S1 interface between eNB2 and eNB1, so that the information about the UE can be exchanged with the serving MME of the UE.

Using the data exchange method in this embodiment, it is implemented that after triggering by a primary base station or configuration by an OAM, a secondary base station initiates an S1 interface setup request, so as to set up an S1 interface that can be used to perform bidirectional data transmission, thereby implementing that bidirectional data exchange is performed between the primary base station and the secondary base station by using the S1 interface.

FIG. 2 is a flowchart of a data exchange method according to the second embodiment of the present invention. As shown in the figure, the method in this embodiment includes the following steps:

Step 201: A primary base station sends a first message to a secondary base station, where the first message is used for notifying the secondary base station to set up an S1 interface.

For example, a primary base station eNB1 expects to set up the S1 interface with a secondary base station eNB2, from the perspective of the secondary base station eNB2, the primary base station eNB1 is considered as a special core network node, and therefore, the primary base station eNB1 may perform UE context management and bearer management on the secondary base station eNB2. For example, UE context management and bearer management procedures in 3GPP TS 36.413 of the S1AP protocol are used between the primary base station eNB1 and the secondary base station eNB2.

Optionally, the S1 interface is an S1 interface used for an inter-base station coordinated service, and an S1 interface setup requirement S1 SETUP REQUIRED/INVOKE message carries an inter-base station coordinated service identifier. For example, a field for recording a name in the S1 interface setup requirement includes information about an inter-base station coordinated service.

The inter-base station coordinated service may be inter-base station coordinated transmission, inter-base station CoMP, inter-base station carrier aggregation, an inter-base station multiflow service, or the like.

In step 201, the primary base station eNB1 sends the S1 interface setup requirement to the secondary base station eNB2, so that the secondary base station eNB2 learns that the primary base station eNB1 expects to set up the S1 interface with the secondary base station eNB2, or the secondary base station eNB2 may learn that, in other manners, the primary base station eNB1 expects to set up the S1 interface with the secondary base station eNB2. For example:

An operation, administration and maintenance system (OAM) sends relationship information configured by the OAM to the primary base station and/or the secondary base station; and/or the S1 interface setup requirement carries an inter-base station coordinated service identifier.

The relationship information is a corresponding relationship between a primary base station and a secondary base station, or a corresponding relationship between a control node and a controlled node.

Step 202: The primary base station receives an S1 interface setup request sent by the secondary base station.

For example, after receiving the S1 interface setup requirement, or receiving the relationship information sent by the OAM, the secondary base station eNB2 learns that the primary base station eNB1 needs the secondary base station eNB2 to request to assist the primary base station eNB1 in serving UE. If the secondary base station eNB2 agrees, the secondary base station eNB2 sends the S1 interface setup request S1 SETUP REQUEST message to the primary base station eNB1. The setup request is sent from the secondary base station eNB2 to the primary base station eNB1, and may carry an inter-base station coordinated service identifier.

Step 203: The primary base station sends an S1 interface setup response to the secondary base station.

If the primary base station eNB1 allows the S1 interface setup, the primary base station eNB1 sends the S1 interface setup response S1 SETUP RESPONSE message to the secondary base station, where the message may carry an inter-base station coordinated service identifier. If the primary base station eNB1 does not allow the S1 interface setup, the primary base station eNB1 returns an S1 setup failure S1 SETUP FAILURE message to the secondary base station.

Step 204: The primary base station performs exchange with the secondary base station by using the S1 interface. For example, an S1 interface connection is set up between the primary base station and the secondary base station, and data exchange is performed by using the S1 interface.

The S1 interface is set up between the primary base station eNB1 and the secondary base station eNB2, and subsequently functions of UE context management and bearer management are reused to implement an inter-base station coordinated transmission service.

Using the data exchange method in this embodiment, it is implemented that after triggering by a primary base station or configuration by an OAM, a secondary base station initiates an S1 interface setup request, so as to set up an S1 interface that can be used to perform bidirectional data transmission, thereby implementing that bidirectional data exchange is performed between the primary base station and the secondary base station by using the S1 interface.

Figure 3:
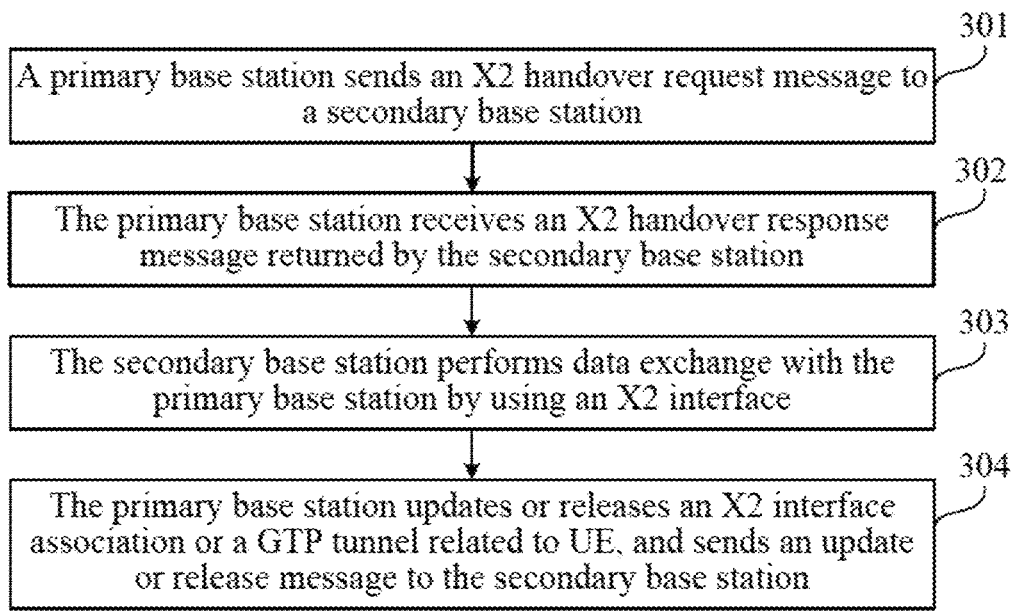
FIG. 3 is a flowchart of a data exchange method according to a third embodiment of the present invention.
Figure 4:
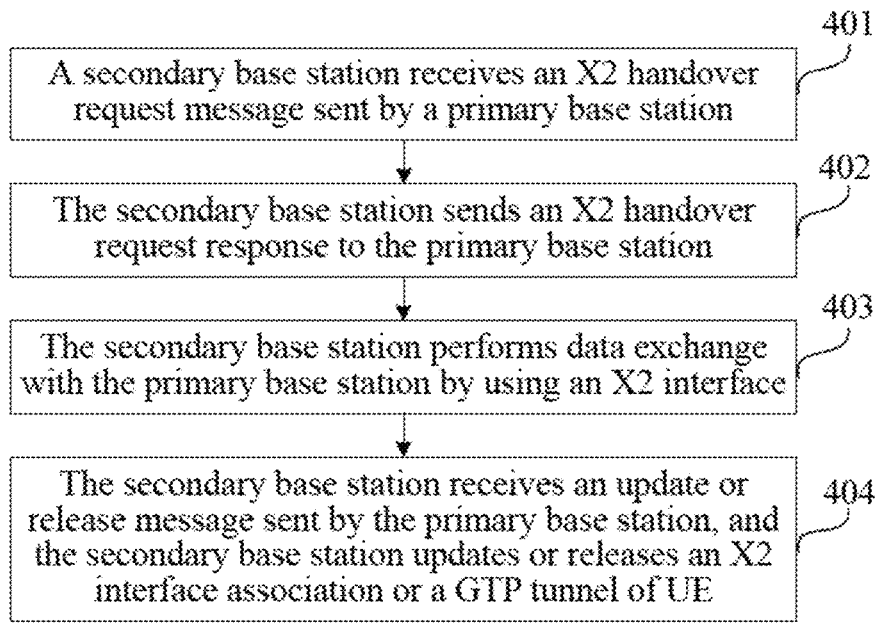
FIG. 4 is a flowchart of a data exchange method according to a fourth embodiment of the present invention.

FIG. 3 and FIG. 4 are flowcharts of data exchange methods according to a third embodiment and a fourth embodiment of the present invention. In the third embodiment and the fourth embodiment, an X2 interface is used to implement inter-base station data exchange.

As shown in FIG. 3, the method in the third embodiment includes the following steps:

Step 301: A primary base station sends an X2 handover request message to a secondary base station, where the X2 handover request message includes tunnel address information allocated by the primary base station to user equipment UE.

The X2 handover request message carries a transport network layer (TNL) address and a General Packet Radio Service (GPRS) Tunneling Protocol (GTP) tunnel endpoint identifier (TEID) that are allocated by the primary base station eNB1 to the UE, or may carry a coordinated service identifier at the same time, and the coordinated service identifier may be an inter-base station coordinated transmission/service identifier, an inter-base station CoMP identifier, an inter-base station carrier aggregation service identifier, an inter-base station multiflow service identifier, or the like.

Step 302: The primary base station eNB1 receives an X2 handover response message returned by the secondary base station eNB2.

The secondary base station eNB2 receives the X2 handover request message, and learns that the primary base station eNB1 expects that the secondary base station eNB2 performs coordinated transmission for the UE. If the secondary base station eNB2 agrees, the secondary base station eNB2 returns a handover response handover request acknowledge message to the primary base station eNB1, where the message may carry an inter-base station coordinated service identifier; if the secondary base station eNB2 does not agree, the secondary base station eNB2 returns a handover preparation failure Handover preparation failure message to the primary base station eNB1.

Step 303: The secondary base station performs data exchange with the primary base station by using an X2 interface. For example, an X2 association and a bidirectional GTP tunnel of the UE are set up between the primary base station eNB1 and the secondary base station eNB2, so as to perform data transmission by using the X2 interface.

In the prior art, during setup of an X2 interface, only a GTP tunnel from a primary base station to a secondary base station is set up, and therefore, the X2 interface can only be used to perform unidirectional data transmission. In this embodiment, the X2 handover request message includes the tunnel address information allocated by the primary base station to the user equipment UE, so that a GTP tunnel from the secondary base station to the primary base station can be set up, and in combination with the prior art, a bidirectional GTP tunnel is set up. Therefore, the X2 interface set up in this embodiment can be used to perform bidirectional data transmission, thereby implementing bidirectional data exchange between the primary base station and the secondary base station.

Preferably, as shown in FIG. 3, the method in this embodiment further includes:

Step 304: The primary base station updates or releases an X2 interface association or a GTP tunnel related to the UE, and sends an update or release message to the secondary base station, so that the secondary base station updates or releases the X2 interface association or the GTP tunnel of the UE. By means of this embodiment, when the primary base station updates information related to the X2 interface, the secondary base station also performs a corresponding update procedure. In this way, the primary base station and the secondary base station have consistent information related to the X2 interface, and the primary base station and the secondary base station may continue to perform exchange by using the X2 interface. When the primary base station releases the information related to the X2 interface, the secondary base station also performs a corresponding release procedure. In this way, a released resource may be used for another procedure, thereby improving system performance.

When the primary base station eNB1 requests the secondary base station eNB2 to stop a coordinated service for the UE, the primary base station eNB1 sends a release message, namely, a handover cancel message, to the secondary base station eNB2 to release the association and the related GTP tunnel of the UE. Preferably, the message may carry an inter-base station coordinated service identifier and/or a bearer identifier.

As shown in FIG. 4, the method in the fourth embodiment includes the following steps:

Step 401: A secondary base station receives an X2 handover request message sent by a primary base station, where the X2 handover request message includes tunnel address information allocated by the primary base station to user equipment UE.

The X2 handover request X2AP Handover request message carries a transport network layer (TNL) address and a GPRS Tunneling Protocol (GTP) tunnel endpoint identifier (TEID) that are allocated by the primary base station eNB1 to the UE, or may carry a coordinated service identifier at the same time, and the coordinated service identifier may be an inter-base station coordinated transmission/service identifier, an inter-base station CoMP identifier, an inter-base station carrier aggregation service identifier, an inter-base station multiflow service identifier, or the like.

Step 402: The secondary base station sends an X2 handover request response to the primary base station.

The secondary base station eNB2 receives the X2 handover request message, and learns that the primary base station eNB1 expects that the secondary base station eNB2 performs coordinated transmission for the UE. If the secondary base station eNB2 agrees, the secondary base station eNB2 returns a handover response Handover request acknowledge message to the primary base station eNB1, where the message may carry an inter-base station coordinated service identifier; if the secondary base station eNB2 does not agree, the secondary base station eNB2 returns a handover preparation failure Handover preparation failure message to the primary base station eNB1.

Step 403: The secondary base station performs data exchange with the primary base station by using an X2 interface. For example, an X2 association and a bidirectional GTP tunnel of the UE are set up between the secondary base station eNB2 and the primary base station eNB1, so as to perform data transmission by using the X2 interface.

In the prior art, during setup of an X2 interface, only a GTP tunnel from a primary base station to a secondary base station is set up, and therefore, the X2 interface can only be used to perform unidirectional data transmission. In this embodiment, the X2 handover request message includes the tunnel address information allocated by the primary base station to the user equipment UE, so that a GTP tunnel from the secondary base station to the primary base station can be set up, and in combination with the prior art, a bidirectional GTP tunnel is set up. Therefore, the X2 interface set up in this embodiment can be used to perform bidirectional data transmission, thereby implementing bidirectional data exchange between the secondary base station and the primary base station.

Preferably, as shown in FIG. 4, the method in this embodiment further includes:

Step 404: The primary base station updates or releases an X2 interface association or a GTP tunnel related to the UE, the secondary base station receives an update or release message sent by the primary base station, and the secondary base station updates or releases the X2 interface association or the GTP tunnel of the UE.

When the primary base station eNB1 requests the secondary base station eNB2 to stop a coordinated service for the UE, the primary base station eNB1 sends a release message, namely, a handover cancel message, to the secondary base station eNB2 to release the association and the related GTP tunnel of the UE. Preferably, the message may carry an inter-base station coordinated service identifier and/or a bearer identifier.

Using the X2AP handover method in Embodiment 3 and Embodiment 4, a transport network layer (TNL) address and a General Packet Radio Service (GPRS) Tunneling Protocol (GTP) tunnel endpoint identifier (TEID) of a primary base station are also sent to a secondary base station. Therefore, bidirectional data transmission between the primary base station and the secondary base station may be implemented by using an X2AP handover procedure. Alternatively, a UE context management procedure and a bearer management procedure may be added to the X2AP protocol, and are the same as those in the S1AP protocol.

Figure 5:
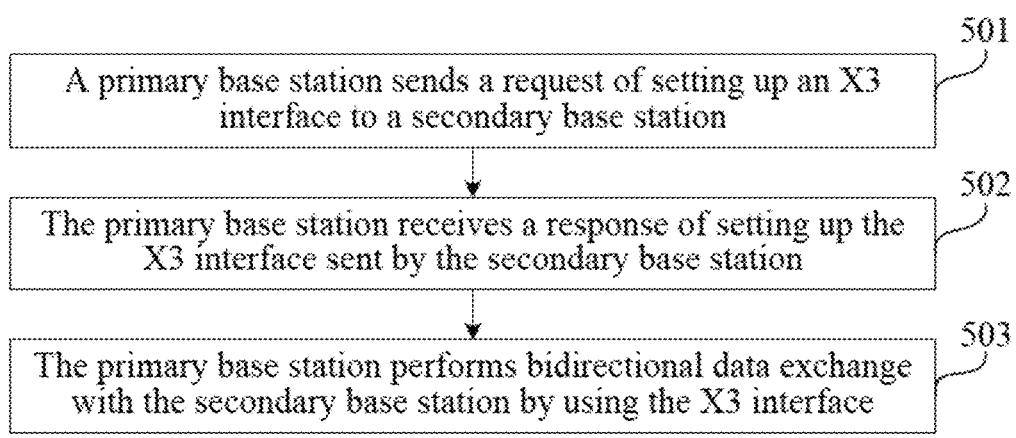
FIG. 5 is a flowchart of a data exchange method according to a fifth embodiment of the present invention.
Figure 6:
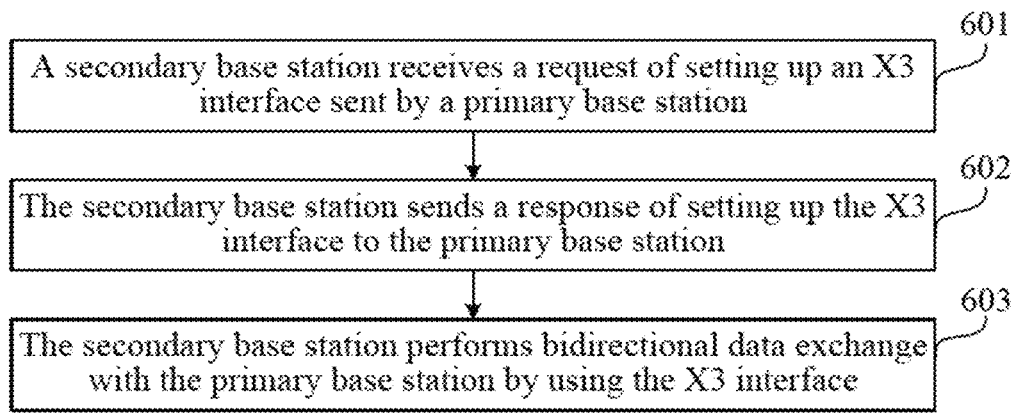
FIG. 6 is a flowchart of a data exchange method according to a sixth embodiment of the present invention.

FIG. 5 and FIG. 6 are flowcharts of data exchange methods according to a fifth embodiment and a sixth embodiment of the present invention. In the fifth embodiment and the sixth embodiment, an X3 interface may be used to perform data exchange.

As shown in FIG. 5, the method in the fifth embodiment includes the following steps:

Step 501: A primary base station sends a request of setting up an X3 interface to a secondary base station, where the X3 interface has a capability of bidirectional data communication.

For example, the X3 interface is an interface of an inter-base station coordinated service and may be implemented by using an S1 interface. The setup request is sent from a primary base station eNB1 to a secondary base station eNB2, that is, the X3 interface setup is initiated from the primary base station to the secondary base station, and in this case, the primary base station may be considered as a "core network device" to which the secondary base station is connected.

The so-called X3 interface may be another existing interface, for example, an existing S1 interface, or may be a newly defined interface, as long as information exchange can be implemented.

Preferably, the X3 interface setup request may be an X3 Setup Request used for an inter-base station coordinated service. The X3 interface setup request carries an inter-base station coordinated service identifier. The inter-base station coordinated service may be inter-base station coordinated transmission/an inter-base station coordinated service, inter-base station CoMP, inter-base station carrier aggregation, an inter-base station multiflow service, or the like.

Step 502: The primary base station receives a response of setting up the X3 interface sent by the secondary base station.

If the secondary base station eNB2 agrees to set up the X3 interface, the secondary base station eNB2 returns an X3 interface setup response X3 setup response message of the inter-base station coordinated service to the primary base station eNB1, where the response message may carry an inter-base station coordinated service identifier.

If the secondary base station eNB2 does not agree to set up the X3 interface, the secondary base station eNB2 returns an X3 setup Failure message of the inter-base station coordinated service, where the X3 setup Failure message may also carry an inter-base station coordinated service identifier.

Step 503: The primary base station performs bidirectional data exchange with the secondary base station by using the X3 interface. For example, an X3 interface of UE is set up between the primary base station eNB1 and the secondary base station eNB2, so as to perform data transmission by using the X3 interface.

In this embodiment, a primary base station sends a request of setting up an X3 interface, so that the X3 interface from the primary base station to a secondary base station can be set up, and the X3 interface may be implemented by an existing interface, for example, an S1 interface, or may be a newly defined interface having a capability of bidirectional data communication. Therefore, the X3 interface set up in this embodiment can be used to perform bidirectional data transmission, thereby implementing bidirectional data exchange between the primary base station and the secondary base station.

As shown in FIG. 6, the method in the sixth embodiment includes the following steps:

Step 601: A secondary base station receives a request of setting up an X3 interface sent by a primary base station, where the X3 interface has a capability of bidirectional data communication.

For example, the X3 interface is an interface of an inter-base station coordinated service and may be implemented by using an S1 interface. The setup request is sent from a primary base station eNB1 to a secondary base station eNB2, that is, the X3 interface setup is initiated from the primary base station to the secondary base station, and in this case, the primary base station may be considered as a "core network device" to which the secondary base station is connected.

The so-called X3 interface may be another existing interface, for example, an existing S1 interface, or may be a newly defined interface, as long as information exchange can be implemented.

Preferably, the X3 interface setup request may be an X3 Setup Request used for an inter-base station coordinated service. The X3 interface setup request carries an inter-base station coordinated service identifier. The inter-base station coordinated service may be inter-base station coordinated transmission/an inter-base station coordinated service, inter-base station CoMP, inter-base station carrier aggregation, an inter-base station multiflow service, or the like.

Step 602: The secondary base station sends a response of setting up the X3 interface to the primary base station.

If the secondary base station eNB2 agrees to set up the X3 interface, the secondary base station eNB2 returns an X3 interface setup response X3 setup response message of the inter-base station coordinated service to the primary base station eNB1, where the response message may carry an inter-base station coordinated service identifier.

If the secondary base station eNB2 does not agree to set up the X3 interface, the secondary base station eNB2 returns an X3 setup Failure message of the inter-base station coordinated service, where the X3 setup Failure message may also carry an inter-base station coordinated service identifier.

Step 603: The secondary base station performs bidirectional data exchange with the primary base station by using the X3 interface. For example, an X3 interface of UE is set up between the secondary base station eNB2 and the primary base station eNB1, so as to perform data transmission by using the X3 interface.

In this embodiment, a secondary base station receives a request of setting up an X3 interface sent by a primary base station, so that the X3 interface from the secondary base station to the primary base station can be set up, and the X3 interface may be implemented by an existing interface, for example, an S1 interface, or may be a newly defined interface having a capability of bidirectional data communication. Therefore, the X3 interface set up in this embodiment can be used to perform bidirectional data transmission, thereby implementing bidirectional data exchange between the secondary base station and the primary base station.

All the foregoing embodiments illustrate a process of interface setup or handover. After the interface setup or handover, the secondary base station eNB2 needs to be used to perform data exchange. The primary base station eNB1 not only provides a function of an MME, but also provides a function of a serving gateway (S-GW). The primary base station eNB1 sends, to the secondary base station eNB2, an S-GW IP address and a GTP TED that are allocated by the primary base station.

From the perspective of a core network node, the primary base station eNB1 is a serving base station of UE, and a core network sends data and control signaling of the UE to the primary base station eNB1. The primary base station eNB1 forwards all or some of the data and control signaling of the UE to eNB2. The UE sends all or some of uplink data of the UE to the secondary base station eNB2, the secondary base station eNB2 sends the received uplink data of the UE to the primary base station eNB1, and the primary base station eNB1 then forwards the uplink data to an actual core network node S-GW.

The primary base station eNB1 is considered as a special core network node by the secondary base station eNB2. The primary base station provides at least the following functions: a UE context management function, a bearer management function, and an interface management function.

The X3 interface in these embodiments is set up in a manner in which the primary base station actively triggers a setup request, and the secondary base station responds to the request. After the X3 interface is set up, the primary base station may provide the following functions: a UE context management function, a bearer management function, and an interface management function.

In this case, the primary base station eNB1 is not included in a range of candidate core network nodes for a NAS node selection function (NNSF) procedure. That is, when UE is newly connected to the secondary base station eNB2, and the UE is not UE for which the secondary base station eNB2 needs to assist the primary eNB1 in transmission, the primary base station eNB1 is not included in a range of candidates when eNB2 selects a core network node for the UE.

In addition, the primary base station eNB1 provides a function of GTP-U tunnel mapping to implement a mapping between a GTP-U tunnel that is between the primary base station eNB1 and the S-GW and a GTP-U tunnel that is between the primary base station eNB1 and the secondary base station eNB2.

Optionally, the secondary base station eNB2 may also directly perform data exchange with the S-GW, and does not need to perform data exchange with the S-GW by using the primary base station eNB1. After an S1 interface is set up between the primary base station eNB1 and the secondary base station eNB2, the primary base station eNB1 changes a TNL address and a GTP TEID in an S1AP message. It should be noted that this embodiment may also be implemented as an independent embodiment.

Specifically, the primary base station eNB1 sends, to the S-GW by using an MME, a received downlink TNL address and a received GTP TED of the secondary base station that are sent by the secondary base station eNB2, and the primary base station eNB1 sends an uplink TNL address and a GTP TED of the S-GW to the secondary base station eNB2. Therefore, data of a bearer of the UE transmitted by the secondary base station eNB2 is directly transmitted between eNB2 and the S-GW, the secondary base station eNB2 sends, to the S-GW, received uplink data sent by the UE, and the secondary base station eNB2 sends, to the UE, received downlink data sent by the S-GW.

A primary base station may perform bidirectional data transmission with a secondary base station. Therefore, the secondary base station may perform data exchange with an S-GW by using the primary base station. The secondary base station may also directly perform data exchange with the S-GW. Therefore, for an inter-base station coordinated service, different base stations may serve different bearers, thereby improving service quality for UE. Existing messages are reused to the maximum degree.

Figure 7:
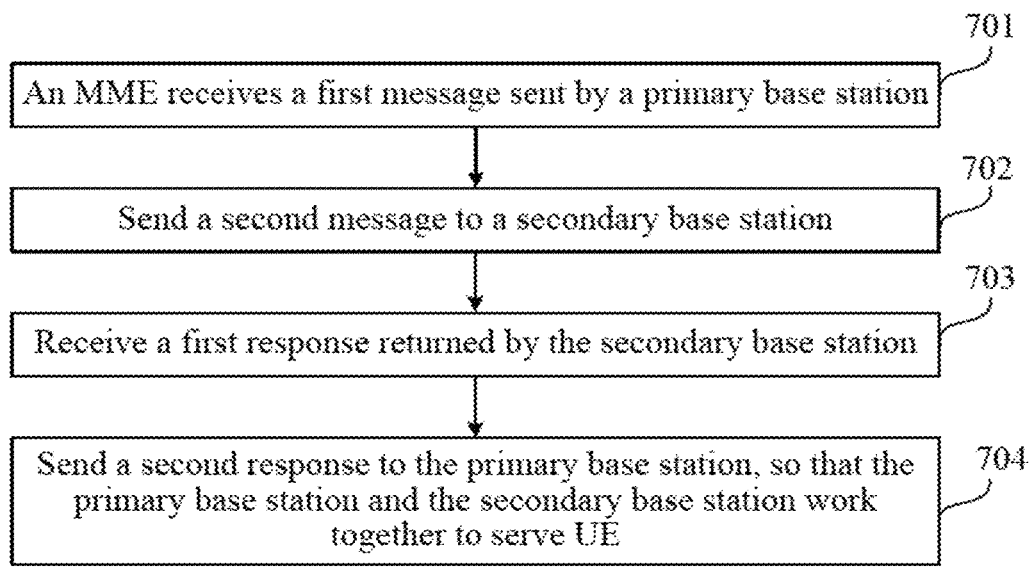
FIG. 7 is a flowchart of a data exchange method according to a seventh embodiment of the present invention.
Figure 8:
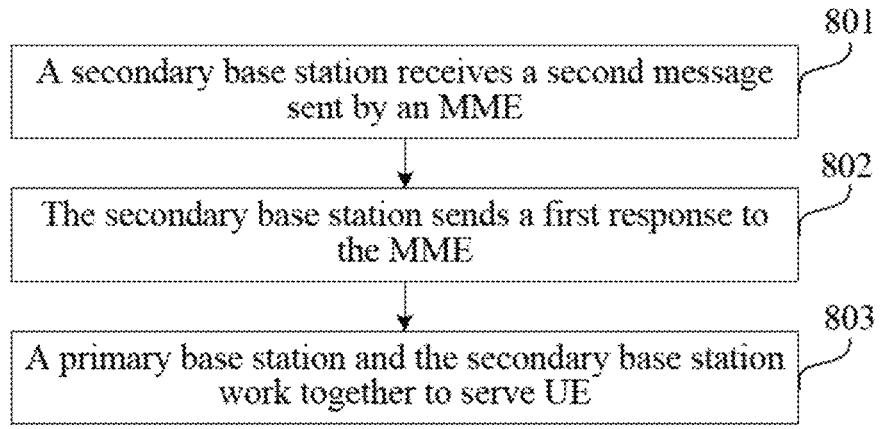
FIG. 8 is a flowchart of a data exchange method according to an eighth embodiment of the present invention.

FIG. 7 and FIG. 8 are flowcharts of data exchange methods according to a seventh embodiment and an eighth embodiment of the present invention respectively. In all the foregoing embodiments, it is the primary base station eNB1 that performs coordinated data exchange with the secondary base station eNB2; in the seventh embodiment and the eighth embodiment, a core network may be used to perform assisted data exchange.

As shown in FIG. 7, the method in the seventh embodiment includes the following steps:

Step 701: An MME receives a first message sent by a primary base station, where the first message is used for requesting a secondary base station to collaborate with the primary base station to serve user equipment UE. Preferably, the first message includes an identifier of the UE and an identifier of the secondary base station.

The primary base station eNB1 sends the first message to the MME to request the secondary base station to collaborate with the primary base station to serve the user equipment UE, where the first message may carry the identifier of the UE, a bearer identifier, and the identifier of the collaborating secondary base station eNB2, so as to notify the MME that which secondary base station eNB2 is expected to coordinate.

Step 702: Send a second message to the secondary base station, where the second message is used for requesting the secondary base station to collaborate with the primary base station to serve the UE. Preferably, the second message includes the identifier of the UE.

If the MME agrees on an inter-base station coordinated service request, the MME sends the second message, for example, an inter base station coordinated service request/command, to the coordinating secondary base station eNB2 to request the secondary base station to collaborate with the primary base station to serve the UE, where the inter-base station coordinated service request/command carries the identifier of the UE and a bearer identifier, and preferably, the inter-base station coordinated service request/command may further carry an identifier of the primary base station.

Step 703: Receive a first response returned by the secondary base station, where the first response carries information that the secondary base station agrees to collaborate with the primary base station to serve the UE.

If the secondary base station eNB2 agrees on the request, the secondary base station eNB2 sends the first response to the MME, where the first response may be an inter-base station coordinated service response message. If the secondary base station eNB2 does not agree on the request, the secondary base station eNB2 returns a failure response.

The secondary base station may allow coordinated transmission of only some bearers, and in this case, the inter-base station coordinated service response message carries identifiers of bearers for which coordinated transmission is allowed.

The MME may determine, according to a bearer identifier carried in the coordinated service response or a bearer identifier carried in the inter-base station coordinated service request in step 701, on which base station each bearer is transmitted; further, the MME may determine, according to load conditions of the primary base station and the secondary base station and information about a bearer of the UE, on which base station each bearer is transmitted.

Step 704: Send a second response to the primary base station, so that the primary base station and the secondary base station work together to serve the UE. Data exchange is performed, between the secondary base station and the MME and between the secondary base station and an S-GW corresponding to the MME, for a bearer of the UE corresponding to the identifier of the UE.

The MME sends the second response message to the primary base station eNB1. If the secondary base station eNB2 does not agree on the request, the secondary base station eNB2 returns a failure response. The MME sends, according to on which base station each bearer is transmitted, a corresponding TNL address and GTP-TEID to a corresponding node (the primary base station eNB1 or the secondary base station eNB2). The secondary base station sends, to the S-GW, received uplink data sent by the UE, and the secondary base station sends, to the UE, received downlink data sent by the S-GW.

In the data exchange method in this embodiment, a network element MME of a core network is used to assist in data exchange, thereby implementing that a primary base station and a secondary base station work together to serve UE. The secondary base station is used to directly perform data transmission with an S-GW, so that for an inter-base station coordinated service, different base stations may serve different bearers, thereby improving service quality for UE. Existing messages are reused to the maximum degree.

As shown in FIG. 8, the method in the eighth embodiment includes the following steps:

Step 801: A secondary base station receives a second message sent by an MME, where the second message is used for requesting the secondary base station to collaborate with a primary base station to serve UE. Preferably, the second message includes a UE identifier.

The primary base station eNB1 sends a first message to the MME to request the secondary base station to collaborate with the primary base station to serve the user equipment UE, where the first message may carry the identifier of the UE, a bearer identifier, and an identifier of the coordinating secondary base station eNB2, so as to notify the MME that which secondary base station eNB2 is expected to coordinate.

Step 802: The secondary base station sends a first response to the MME, where the first response carries information that the secondary base station agrees on the first message of collaborating with the primary base station to serve the UE, so that the MME sends a second response to the primary base station.

If the MME agrees on an inter-base station coordinated service request, the MME sends the second message, for example, an inter-base station coordinated service request/command, to the coordinating secondary base station eNB2 to request the secondary base station to collaborate with the primary base station to serve the UE, where the inter-base station coordinated service request/command carries the identifier of the UE and a bearer identifier, and preferably, the inter-base station coordinated service request/command may further carry an identifier of the primary base station.

If the secondary base station eNB2 agrees on the request, the secondary base station eNB2 sends the first response, for example, an inter-base station coordinated service response message, to the MME. If the secondary base station eNB2 does not agree on the request, the secondary base station eNB2 returns a failure response.

The secondary base station may allow coordinated transmission of only some bearers, and in this case, the inter-base station coordinated service response message carries identifiers of bearers for which coordinated transmission is allowed.

The MME may determine, according to a bearer identifier carried in the coordinated service response or a bearer identifier carried in the inter-base station coordinated service request in step 801, on which base station each bearer is transmitted; further, the MME may determine, according to load conditions of the primary base station and the secondary base station and information about a bearer of the UE, on which base station each bearer is transmitted.

Step 803: The primary base station and the secondary base station work together to serve the UE. Data exchange is performed, between the secondary base station and the MME and between the secondary base station and an S-GW corresponding to the MME, for a bearer of the UE corresponding to the identifier of the UE.

The MME sends the related second response message to the primary base station eNB1. If the secondary base station eNB2 does not agree on the request, the secondary base station eNB2 returns a failure response. The MME sends, according to on which base station each bearer is transmitted, a corresponding TNL address and GTP-TEID to a corresponding node (the primary base station eNB1 or the secondary base station eNB2). The secondary base station sends, to the S-GW, received uplink data sent by the UE, and the S-GW sends, to the UE, received downlink data sent by the S-GW.

In the data exchange method in this embodiment, a network element MME of a core network is used to assist in data exchange, thereby implementing that a primary base station and a secondary base station work together to serve UE. The secondary base station is used to directly perform data transmission with an S-GW, so that for an inter-base station coordinated service, different base station may serve different bearers, thereby improving service quality for UE. Existing messages are reused to the maximum degree.

Figure 9:
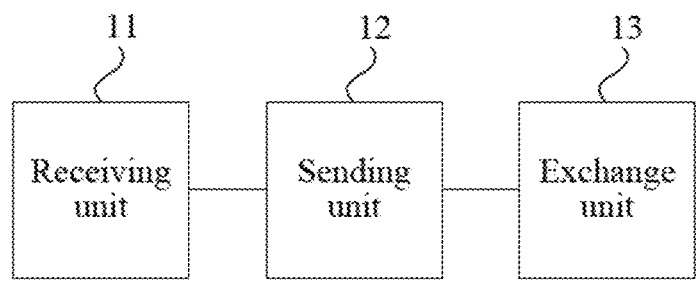
FIG. 9 is a schematic diagram of a data exchange apparatus according to a first embodiment of the present invention.

FIG. 9 is a schematic diagram of a data exchange apparatus according to a first embodiment of the present invention. The apparatus in this embodiment is a secondary base station, and as shown in the figure, the data exchange apparatus in this embodiment specifically includes: a receiving unit 11, a sending unit 12, and an exchange unit 13.

The receiving unit 11 is configured to receive a first message sent by a primary base station, or receive relationship information of the secondary base station and a primary base station configured by an operation, administration and maintenance system OAM, where the first message is used for notifying the secondary base station to set up an S1 interface; the sending unit 12 is configured to send an S1 interface setup request to the primary base station; the receiving unit 11 is further configured to receive an S1 interface setup response sent by the primary base station; and the exchange unit 13 is configured to perform exchange with the primary base station by using the S1 interface.

The exchange unit 13 may include the receiving unit 11 and/or the sending unit 12, or may be another unit having a sending and/or receiving function.

Specifically, the first message carries an inter-base station coordinated service identifier, the S1 interface setup request carries an inter-base station coordinated service identifier, and/or the S1 interface setup response carries an inter-base station coordinated service identifier. The first message is sent by the primary base station after the primary base station receives the relationship information of the secondary base station and the primary base station from the OAM.

Preferably, the receiving unit 11 is further configured to receive an Internet Protocol IP address and a tunnel endpoint identifier TED of the primary base station that are sent by the primary base station; and the exchange unit 13 is configured to: send, to the primary base station, received uplink data sent by user equipment UE, so that the primary base station sends the uplink data to a serving gateway S-GW; and/or receive downlink data that is from the S-GW and is forwarded by the primary base station, and send the downlink data to the UE.

Preferably, the sending unit 12 is further configured to send a downlink transport network layer address TNL address and a General Packet Radio Service Tunneling Protocol tunnel endpoint identifier GTP TEID of the secondary base station to the primary base station, so that the primary base station sends the downlink TNL address and the GTP TED of the secondary base station to an S-GW by using a mobility management entity MME, and the secondary base station receives an uplink TNL address and a GTP TEID of the S-GW that are sent by the primary base station; and the sending unit 12 is further configured to send, to the S-GW, received uplink data sent by the UE, and send, to the UE, received downlink data sent by the S-GW.

The data exchange apparatus in this embodiment implements that a secondary base station initiates an S1 interface setup request after triggering by a primary base station or configuration by an OAM, so as to set up an S1 interface that can be used to perform bidirectional data transmission, thereby implementing that bidirectional data exchange is performed between the primary base station and the secondary base station by using the S1 interface.

Figure 10:
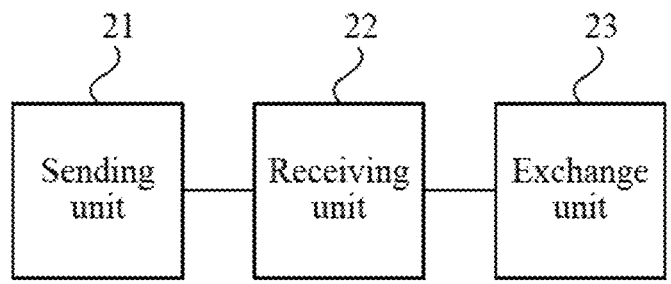
FIG. 10 is a schematic diagram of a data exchange apparatus according to a second embodiment of the present invention.

FIG. 10 is a schematic diagram of a data exchange apparatus according to a second embodiment of the present invention. The apparatus in this embodiment is a primary base station, and as shown in the figure, the data exchange apparatus in this embodiment specifically includes: a sending unit 21, a receiving unit 22, and an exchange unit 23.

The sending unit 21 is configured to send a first message to a secondary base station, where the first message is used for notifying the secondary base station to set up an S1 interface; the receiving unit 22 is configured to receive an S1 interface setup request sent by the secondary base station; the sending unit 21 is further configured to send an S1 interface setup response to the secondary base station; and the exchange unit 23 is configured to perform exchange with the secondary base station by using the S1 interface.

The exchange unit 23 may include the sending unit 21 and/or the receiving unit 22, or may be another unit having a sending and/or receiving function.

Preferably, the first message carries an inter-base station coordinated service identifier, the S1 interface setup request carries an inter-base station coordinated service identifier, and/or the S1 interface setup response carries an inter-base station coordinated service identifier.

Preferably, the receiving unit 22 is further configured to receive relationship information of the secondary base station and the primary base station from an OAM, and the sending unit 21 is further configured to send the first message to the secondary base station.

Preferably, the sending unit 21 is further configured to send an Internet Protocol IP address and a tunnel endpoint identifier TEID of the primary base station to the secondary base station; and the exchange unit 23 is configured to: receive uplink data that is sent by the secondary base station and received from user equipment UE, and send the uplink data to an S-GW; and/or forward, to the secondary base station, downlink data from the S-GW, so that the secondary base station sends the downlink data to the UE.

Preferably, the sending unit 21 is further configured to send, to an S-GW by using an MME, a received downlink TNL address and a received GTP TEID of the secondary base station that are sent by the secondary base station, and send an uplink TNL address and a GTP TEID of the S-GW to the secondary base station, so that the secondary base station sends, to the S-GW, received uplink data sent by the UE, and the secondary base station sends, to the UE, received downlink data sent by the S-GW.

The data exchange apparatus in this embodiment implements that a secondary base station initiates an S1 interface setup request after triggering by a primary base station or configuration by an OAM, so as to set up an S1 interface that can be used to perform bidirectional data transmission, thereby implementing that bidirectional data exchange is performed between the primary base station and the secondary base station by using the S1 interface.

Figure 11:
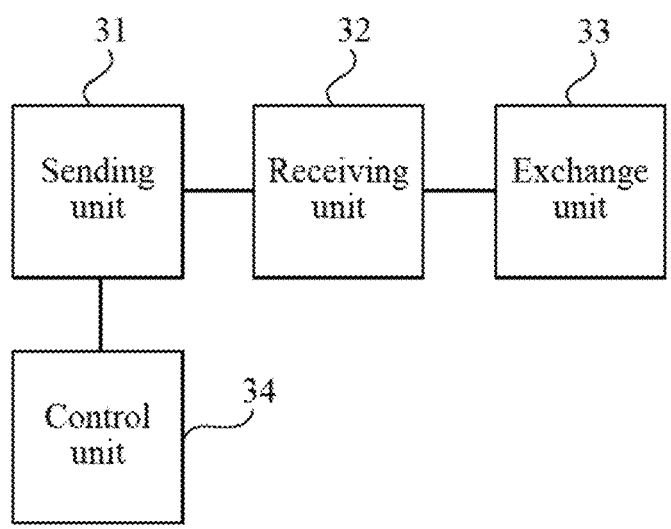
FIG. 11 is a schematic diagram of a data exchange apparatus according to a third embodiment of the present invention.

FIG. 11 is a schematic diagram of a data exchange apparatus according to a third embodiment of the present invention. The apparatus in this embodiment is a primary base station, and as shown in the figure, the data exchange apparatus in this embodiment specifically includes: a sending unit 31, a receiving unit 32, and an exchange unit 33.

The sending unit 31 is configured to send an X2 handover request message to a secondary base station, where the X2 handover request message includes tunnel address information allocated by the primary base station to user equipment UE; the receiving unit 32 is configured to receive an X2 handover request response sent by the secondary base station; and the exchange unit 33 is configured to perform data exchange with the secondary base station by using an X2 interface.

The exchange unit 33 may include the sending unit 31 and/or the receiving unit 32, or may be another unit having a sending and/or receiving function.

Specifically, the tunnel address information includes: a TNL address and a GTP TEID that are allocated by the primary base station to the UE. The X2 handover request message carries an inter-base station coordinated service identifier; and/or the X2 handover request response carries an inter-base station coordinated service identifier.

Preferably, the apparatus further includes a control unit 34, configured to update or release an X2 interface association or a GTP tunnel related to the UE, and the sending unit 31 is further configured to send an update or release message to the secondary base station, so that the secondary base station updates or releases the X2 interface association or the GTP tunnel of the UE. The update or release message carries the inter-base station coordinated service identifier and a bearer identifier.

For the data exchange apparatus in this embodiment, an X2 handover request message includes tunnel address information allocated by a primary base station to user equipment UE, so that a GTP tunnel from a secondary base station to the primary base station can be set up, that is, a bidirectional GTP tunnel is set up; therefore, an X2 interface set up in this embodiment can be used to perform bidirectional data transmission, thereby implementing bidirectional data exchange between the primary base station and the secondary base station.

Figure 12:
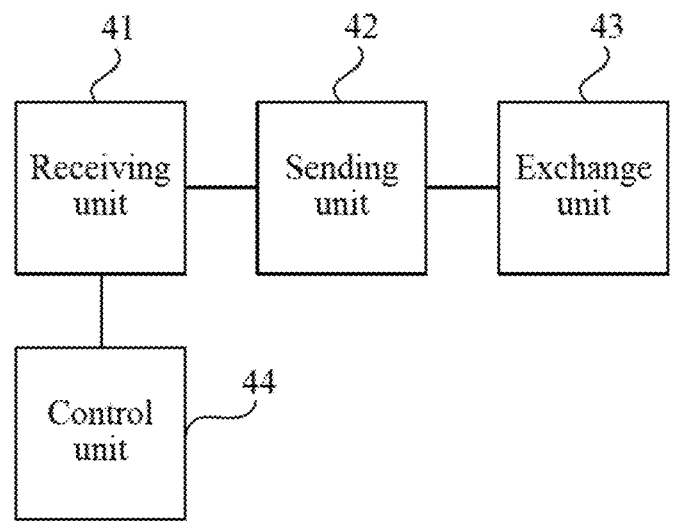
FIG. 12 is a schematic diagram of a data exchange apparatus according to a fourth embodiment of the present invention.

FIG. 12 is a schematic diagram of a data exchange apparatus according to a fourth embodiment of the present invention. The apparatus in this embodiment is a secondary base station, and as shown in the figure, the data exchange apparatus in this embodiment specifically includes: a receiving unit 41, a sending unit 42, and an exchange unit 43.

The receiving unit 41 is configured to receive an X2 handover request message sent by a primary base station, where the X2 handover request message includes tunnel address information allocated by the primary base station to user equipment UE; the sending unit 42 is configured to send an X2 handover request response to the primary base station; and the exchange unit 43 is configured to perform data exchange with the primary base station by using an X2 interface.

The exchange unit 43 may include the receiving unit 41 and/or the sending unit 42, or may be another unit having a sending and/or receiving function.

Specifically, the tunnel address information includes: a TNL address and a GTP TEID that are allocated by the primary base station to the UE. The X2 handover request message carries an inter-base station coordinated service identifier; and/or the X2 handover request response carries an inter-base station coordinated service identifier.

Preferably, the receiving unit 41 is configured to receive an update or release message sent by the primary base station; and the apparatus further includes a control unit 44, configured to update or release an X2 interface association or a GTP tunnel of the UE. The update or release message carries the inter-base station coordinated service identifier and a bearer identifier.

For the data exchange apparatus in this embodiment, an X2 handover request message includes tunnel address information allocated by a primary base station to user equipment UE, so that a GTP tunnel from a secondary base station to the primary base station can be set up, that is, a bidirectional GTP tunnel is set up; therefore, an X2 interface set up in this embodiment can be used to perform bidirectional data transmission, thereby implementing bidirectional data exchange between the secondary base station and the primary base station.

Figure 13:
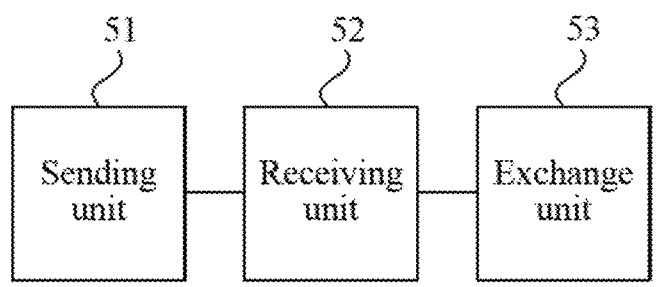
FIG. 13 is a schematic diagram of a data exchange apparatus according to a fifth embodiment of the present invention.

FIG. 13 is a schematic diagram of a data exchange apparatus according to a fifth embodiment of the present invention. The apparatus in this embodiment is a primary base station, and as shown in the figure, the data exchange apparatus in this embodiment specifically includes: a sending unit 51, a receiving unit 52, and an exchange unit 53.

The sending unit 51 is configured to send a request of setting up an X3 interface to a secondary base station, where the X3 interface has a capability of bidirectional data communication; the receiving unit 52 is configured to receive a response of setting up the X3 interface sent by the secondary base station; and the exchange unit 53 is configured to perform bidirectional data exchange with the secondary base station by using the X3 interface.

The exchange unit 53 may include the sending unit 51 and/or the receiving unit 52, or may be another unit having a sending and/or receiving function.

Specifically, the request of setting up the X3 interface carries an inter-base station coordinated service identifier, and/or the response of setting up the X3 interface carries an inter-base station coordinated service identifier. The X3 interface includes: an S1 interface.

Preferably, the sending unit 51 is further configured to send an Internet Protocol IP address and a tunnel endpoint identifier TEID of the primary base station to the secondary base station; and the exchange unit 53 is specifically configured to: receive uplink data that is sent by user equipment UE and forwarded by the secondary base station, and send the uplink data to a serving gateway S-GW; and send, to the secondary base station, downlink data sent by the S-GW, so that the secondary base station sends the downlink data to the UE.

Preferably, the sending unit 51 is further configured to send a downlink TNL address and a GTP TEID of the secondary base station to an S-GW by using an MME, and send an uplink TNL address and a GTP TEID of the S-GW to the secondary base station, so that the secondary base station sends, to the S-GW, received uplink data sent by UE, and sends, to the UE, received downlink data sent by the S-GW.

For the data exchange apparatus in this embodiment, a primary base station sends a request of setting up an X3 interface, so that an X3 interface from the primary base station to a secondary base station can be set up, and the X3 interface may be implemented by an existing interface, for example, an S1 interface, or may be a newly defined interface having a capability of bidirectional data communication. Therefore, the X3 interface set up in this embodiment can be used to perform bidirectional data transmission, thereby implementing bidirectional data exchange between the primary base station and the secondary base station.

Figure 14:
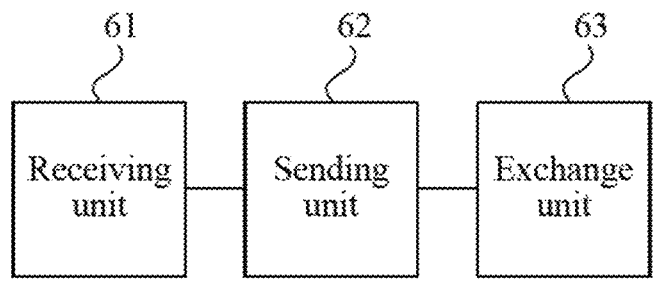
FIG. 14 is a schematic diagram of a data exchange apparatus according to a sixth embodiment of the present invention.

FIG. 14 is a schematic diagram of a data exchange apparatus according to a sixth embodiment of the present invention. The apparatus in this embodiment is a secondary base station, and as shown in the figure, the data exchange apparatus in this embodiment specifically includes: a receiving unit 61, a sending unit 62, and an exchange unit 63.

The receiving unit 61 is configured to receive a request of setting up an X3 interface sent by a primary base station, where the X3 interface has a capability of bidirectional data communication; the sending unit 62 is configured to send a response of setting up the X3 interface to the primary base station; and the exchange unit 63 is configured to perform bidirectional data exchange with the primary base station by using the X3 interface.

The exchange unit 63 may include the receiving unit 61 and/or the sending unit 62, or may be another unit having a sending and/or receiving function.

Specifically, the request of setting up the X3 interface carries an inter-base station coordinated service identifier, and/or the response of setting up the X3 interface carries an inter-base station coordinated service identifier. The X3 interface includes: an S1 interface.

Preferably, the receiving unit 61 is further configured to receive an Internet Protocol IP address and a tunnel endpoint identifier TED of the primary base station that are sent by the primary base station; and the exchange unit 63 is specifically configured to: send, to the primary base station, forwarded uplink data sent by user equipment UE, so that the primary base station sends the uplink data to a serving gateway S-GW; and receive downlink data that is sent by the S-GW and then sent by the primary base station, so that the secondary base station sends the downlink data to the UE.

Preferably, the exchange unit 63 is further configured to: receive an uplink transport network layer address TNL address and a General Packet Radio Service Tunneling Protocol tunnel endpoint identifier GTP TED of an S-GW that are sent by the primary base station; send, to the S-GW, received uplink data sent by UE; and send, to the UE, received downlink data from the S-GW.

For the data exchange apparatus in this embodiment, a secondary base station receives a request of setting up an X3 interface sent by a primary base station, so that an X3 interface from the secondary base station to the primary base station can be set up, and the X3 interface may be implemented by an existing interface, for example, an S1 interface, or may be a newly defined interface having a capability of bidirectional data communication. Therefore, the X3 interface set up in this embodiment can be used to perform bidirectional data transmission, thereby implementing bidirectional data exchange between the secondary base station and the primary base station.

Figure 15:
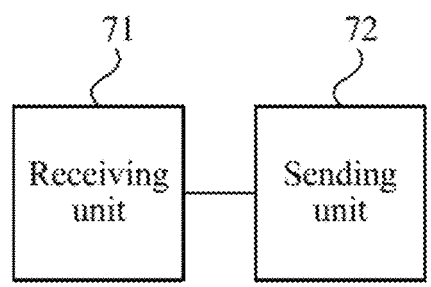
FIG. 15 is a schematic diagram of a data exchange apparatus according to a seventh embodiment of the present invention.

FIG. 15 is a schematic diagram of a data exchange apparatus according to a seventh embodiment of the present invention. The apparatus in this embodiment is a mobility management entity MME, and as shown in the figure, the data exchange apparatus in this embodiment specifically includes: a receiving unit 71 and a sending unit 72.

The receiving unit 71 is configured to receive a first message sent by a primary base station, where the first message is used for requesting a secondary base station to collaborate with the primary base station to serve user equipment (UE), and the first message includes an identifier of the UE and an identifier of the secondary base station; the sending unit 72 is configured to send a second message to the secondary base station, where the second message is used for requesting the secondary base station to collaborate with the primary base station to serve the UE, and the second message includes the identifier of the UE; the receiving unit 71 is further configured to receive a first response returned by the secondary base station, where the first response is used for indicating information that the secondary base station agrees to collaborate with the primary base station to serve the UE; and the sending unit 72 is further configured to send a second response to the primary base station, so that the primary base station and the secondary base station work together to serve the UE.

Preferably, the sending unit 72 is further configured to notify an S-GW corresponding to the UE of address information of the secondary base station, and notify the secondary base station of address information of the S-GW, so that the secondary base station performs data exchange with the S-GW for the UE. The address information of the secondary base station includes: a TNL address and a GTP-TEID of the secondary base station, and the address information of the S-GW includes: a TNL address and a GTP-TEID of the S-GW.

For the data exchange apparatus in this embodiment, a network element MME of a core network is used to assist in data exchange, thereby implementing that a primary base station and a secondary base station work together to serve UE. The secondary base station is used to directly perform data transmission with an S-GW, so that for an inter-base station coordinated service, different base stations may serve different bearers, thereby improving service quality for UE. Existing messages are reused to the maximum degree.

Figure 16:
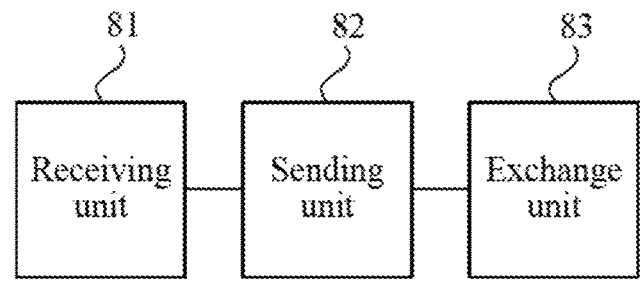
FIG. 16 is a schematic diagram of a data exchange apparatus according to an eighth embodiment of the present invention.

FIG. 16 is a schematic diagram of a data exchange apparatus according to an eighth embodiment of the present invention. The apparatus in this embodiment is a secondary base station, and as shown in the figure, the data exchange apparatus in this embodiment specifically includes: a receiving unit 81 and a sending unit 82.

The receiving unit 81 is configured to receive a second message sent by an MME, where the second message is used for requesting the secondary base station to collaborate with a primary base station to serve UE, and the second message includes an identifier of the UE; and the sending unit 82 is configured to send a first response to the MME, where the first response is used for indicating information that the secondary base station agrees to collaborate with the primary base station to serve the UE, so that the MME sends a second response to the primary base station, where the second response is used for notifying that the primary base station works together with the secondary base station to serve the UE.

Preferably, the receiving unit 81 is further configured to receive address information, sent by the MME, of an S-GW corresponding to the UE; and the apparatus further includes an exchange unit 83, configured to perform, according to the address information of the S-GW, data exchange with the S-GW for the UE. The address information of the S-GW includes: a TNL address and a GTP-TEID of the S-GW.

The exchange unit 83 may include the receiving unit 81 and/or the sending unit 82, or may be another unit having a sending and/or receiving function.

Preferably, the exchange unit 83 is further configured to send, to an S-GW, received uplink data sent by the UE, and send, to the UE, received downlink data sent by the S-GW.

For the data exchange apparatus in this embodiment, a network element MME of a core network is used to assist in data exchange, thereby implementing that a primary base station and a secondary base station work together to serve UE. The secondary base station is used to directly perform data transmission with an S-GW, so that for an inter-base station coordinated service, different base stations may serve different bearers, thereby improving service quality for UE. Existing messages are reused to the maximum degree.

Figure 17:
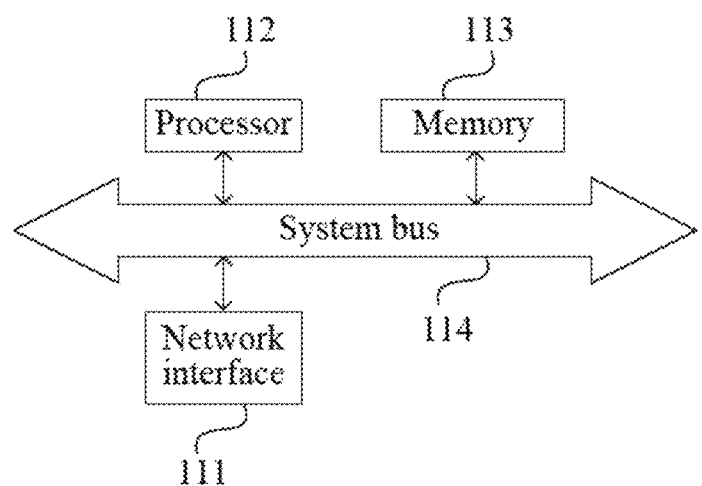
FIG. 17 is a schematic diagram of another data exchange apparatus according to a first embodiment of the present invention.

FIG. 17 is a schematic diagram of another data exchange apparatus according to a first embodiment of the present invention. The apparatus in this embodiment is a secondary base station, and as shown in the figure, this embodiment includes a network interface 111, a processor 112, and a memory 113. Optionally, the apparatus further includes a system bus 114, configured to connect the network interface 111, the processor 112, and the memory 113. Optionally, the network interface 111 and the processor 112 are connected, and the processor 112 and the memory 113 are connected.

The network interface 111 is configured to communicate with an external device.

The memory 113 may be a permanent memory, for example, a hard disk drive and a flash memory, and the memory 113 has a software module and a device driver program. The software module can perform various functional modules in the foregoing methods of the present invention. The device driver program may be a network and interface driver program.

When being started, a software component, for example, the software module and/or the device driver program, is loaded to the memory 113, and is then accessed by the processor 112 and executes the following instructions:

an instruction used for receiving a first message sent by a primary base station, or receiving relationship information of the secondary base station and a primary base station configured by an operation, administration and maintenance system (OAM), where the first message is used for notifying the secondary base station to set up an S1 interface;

an instruction used for sending an S1 interface setup request to the primary base station;

an instruction used for receiving an S1 interface setup response sent by the primary base station; and an instruction used for performing exchange with the primary base station by using the S1 interface; and the processor is configured to execute an application program.

Specifically, the first message carries an inter-base station coordinated service identifier, the S1 interface setup request carries an inter-base station coordinated service identifier, and/or the S1 interface setup response carries an inter-base station coordinated service identifier. The first message is sent by the primary base station after the primary base station receives the relationship information of the secondary base station and the primary base station from the OAM.

Preferably, the application program further includes: an instruction used for receiving an Internet Protocol (IP) address and a tunnel endpoint identifier (TEID) of the primary base station that are sent by the primary base station.

Preferably, the instruction used for performing exchange with the primary base station by using the S1 interface includes: an instruction used for sending, to the primary base station, received uplink data sent by user equipment UE, so that the primary base station sends the uplink data to an S-GW; and/or an instruction used for receiving downlink data that is from the S-GW and is forwarded by the primary base station, and sending the downlink data to the UE.

Preferably, the application program further includes: an instruction used for sending, to an S-GW by using an MME, a received downlink TNL address and a received GTP TEID of the secondary base station that are sent by the secondary base station, and an instruction used for sending an uplink TNL address and a GTP TEID of the S-GW to the secondary base station, so that the secondary base station sends, to the S-GW, received uplink data sent by the UE, and the secondary base station sends, to the UE, received downlink data sent by the S-GW.

The data exchange apparatus in this embodiment implements that a secondary base station initiates an S1 interface setup request after triggering by a primary base station or configuration by an OAM, so as to set up an S1 interface that can be used to perform bidirectional data transmission, thereby implementing that bidirectional data exchange is performed between the primary base station and the secondary base station by using the S1 interface.

Figure 18:
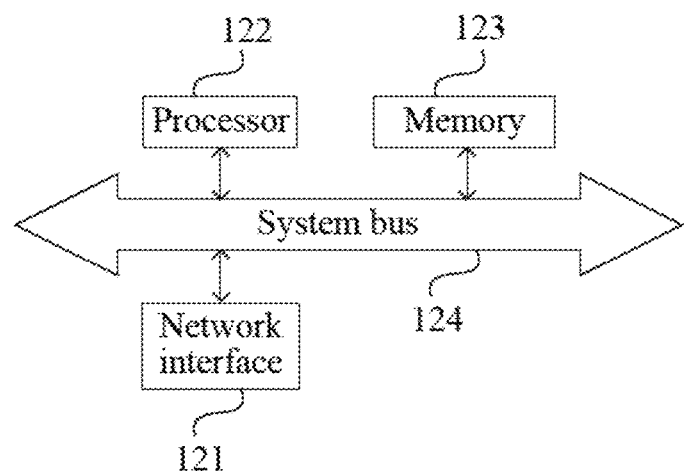
FIG. 18 is a schematic diagram of another data exchange apparatus according to a second embodiment of the present invention.

FIG. 18 is a schematic diagram of another data exchange apparatus according to a second embodiment of the present invention. The apparatus in this embodiment is a primary base station, and as shown in the figure, this embodiment includes a network interface 121, a processor 122, and a memory 123. Optionally, the apparatus further includes a system bus 124, configured to connect the network interface 121, the processor 122, and the memory 123. Optionally, the network interface 121 and the processor 122 are connected, and the processor 122 and the memory 123 are connected.

The network interface 121 is configured to communicate with an external device.

The memory 123 may be a permanent memory, for example, a hard disk drive and a flash memory, and the memory 123 has a software module and a device driver program. The software module can perform various functional modules in the foregoing methods of the present invention. The device driver program may be a network and interface driver program.

When being started, a software component, for example, the software module and/or the device driver program, is loaded to the memory 123, and is then accessed by the processor 122 and executes the following instructions:

an instruction used for sending a first message to a secondary base station, where the first message is used for notifying the secondary base station to set up an S1 interface;

an instruction used for receiving an S1 interface setup request sent by the secondary base station;

an instruction used for sending an S1 interface setup response to the secondary base station; and an instruction used for performing exchange with the secondary base station by using the S1 interface; and the processor is configured to execute an application program.

Preferably, the first message carries an inter-base station coordinated service identifier, the S1 interface setup request carries an inter-base station coordinated service identifier, and/or the S1 interface setup response carries an inter-base station coordinated service identifier.

Preferably, the instruction used for sending a first message to a secondary base station includes: an instruction used for receiving relationship information of the secondary base station and the primary base station from an OAM, and an instruction used for sending the first message to the secondary base station.

Preferably, the application program further includes: an instruction used for sending an Internet Protocol IP address and a tunnel endpoint identifier TED of the primary base station to the secondary base station.

Preferably, the instruction used for performing exchange with the secondary base station by using the S1 interface includes: an instruction used for receiving uplink data that is sent by the secondary base station and received from user equipment UE, and an instruction used for sending the uplink data to an S-GW; and/or an instruction used for forwarding, to the secondary base station, downlink data from the S-GW, so that the secondary base station sends the downlink data to the UE.

Preferably, the application program further includes: an instruction used for sending, to an S-GW by using an MME, a received downlink TNL address and a received GTP TEID of the secondary base station that are sent by the secondary base station, and an instruction used for sending an uplink TNL address and a GTP TEID of the S-GW to the secondary base station, so that the secondary base station sends, to the S-GW, received uplink data sent by the UE, and the secondary base station sends, to the UE, received downlink data sent by the S-GW.

The data exchange apparatus in this embodiment implements that a secondary base station initiates an S1 interface setup request after triggering by a primary base station or configuration by an OAM, so as to set up an S1 interface that can be used to perform bidirectional data transmission, thereby implementing that bidirectional data exchange is performed between the primary base station and the secondary base station by using the S1 interface.

Figure 19:
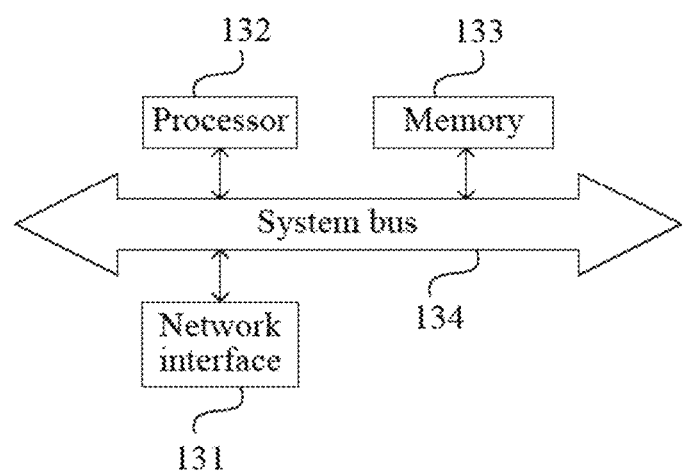
FIG. 19 is a schematic diagram of another data exchange apparatus according to a third embodiment of the present invention.

FIG. 19 is a schematic diagram of another data exchange apparatus according to a third embodiment of the present invention. As shown in the figure, the apparatus in this embodiment is a primary base station, and this embodiment includes a network interface 131, a processor 132, and a memory 133. Optionally, the apparatus further includes a system bus 134, configured to connect the network interface 131, the processor 132, and the memory 133. Optionally, the network interface 131 and the processor 132 are connected, and the processor 132 and the memory 133 are connected.

The network interface 131 is configured to communicate with an external device.

The memory 133 may be a permanent memory, for example, a hard disk drive and a flash memory, and the memory 133 has a software module and a device driver program. The software module can perform various functional modules in the foregoing methods of the present invention. The device driver program may be a network and interface driver program.

When being started, a software component, for example, the software module and/or the device driver program, is loaded to the memory 133, and is then accessed by the processor 132 and executes the following instructions:

an instruction used for sending an X2 handover request message to a secondary base station, where the X2 handover request message includes tunnel address information allocated by the primary base station to user equipment UE;

an instruction used for receiving an X2 handover request response sent by the secondary base station; and an instruction used for performing data exchange with the secondary base station by using an X2 interface; and the processor is configured to execute an application program.

Specifically, the tunnel address information includes: a TNL address and a GTP TEID that are allocated by the primary base station to the UE. The X2 handover request message carries an inter-base station coordinated service identifier; and/or the X2 handover request response carries an inter-base station coordinated service identifier.

Preferably, the application program further includes: an instruction used for updating or releasing an X2 interface association or a GTP tunnel related to the UE, and sending an update or release message to the secondary base station, so that the secondary base station updates or releases the X2 interface association or the General Packet Radio Service Tunneling Protocol GTP tunnel of the UE. The update or release message carries the inter-base station coordinated service identifier and a bearer identifier.

For the data exchange apparatus in this embodiment, an X2 handover request message includes tunnel address information allocated by a primary base station to user equipment UE, so that a GTP tunnel from a secondary base station to the primary base station can be set up, that is, a bidirectional GTP tunnel is set up; therefore, an X2 interface set up in this embodiment can be used to perform bidirectional data transmission, thereby implementing bidirectional data exchange between the primary base station and the secondary base station.

Figure 20:
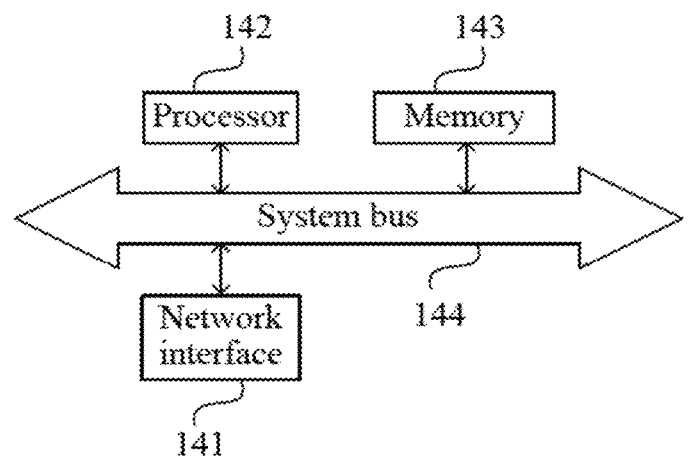
FIG. 20 is a schematic diagram of another data exchange apparatus according to a fourth embodiment of the present invention.

FIG. 20 is a schematic diagram of another data exchange apparatus according to a fourth embodiment of the present invention. The apparatus in this embodiment is a secondary base station, and as shown in the figure, this embodiment includes a network interface 141, a processor 142, and a memory 143. Optionally, the apparatus further includes a system bus 144, configured to connect the network interface 141, the processor 142, and the memory 143. Optionally, the network interface 141 and the processor 142 are connected, and the processor 142 and the memory 143 are connected.

The network interface 141 is configured to communicate with an external device.

The memory 143 may be a permanent memory, for example, a hard disk drive and a flash memory, and the memory 143 has a software module and a device driver program. The software module can perform various functional modules in the foregoing methods of the present invention. The device driver program may be a network and interface driver program.

When being started, a software component, for example, the software module and/or the device driver program, is loaded to the memory 143, and is then accessed by the processor 142 and executes the following instructions:

an instruction used for receiving an X2 handover request message sent by a primary base station, where the X2 handover request message includes tunnel address information allocated by the primary base station to user equipment UE;

an instruction used for sending an X2 handover request response to the primary base station; and an instruction used for performing data exchange with the primary base station by using an X2 interface; and the processor is configured to execute an application program.

Specifically, the tunnel address information includes: a TNL address and a GTP TEID that are allocated by the primary base station to the UE. The X2 handover request message carries an inter-base station coordinated service identifier; and/or the X2 handover request response carries an inter-base station coordinated service identifier.

Preferably, the application program further includes: an instruction used for receiving an update or release message sent by the primary base station, and updating or releasing an X2 interface association or a General Packet Radio Service (GPRS) Tunneling Protocol (GTP) tunnel of the UE. The update or release message carries the inter-base station coordinated service identifier and a bearer identifier.

For the data exchange apparatus in this embodiment, an X2 handover request message includes tunnel address information allocated by a primary base station to user equipment UE, so that a GTP tunnel from a secondary base station to the primary base station can be set up, that is, a bidirectional GTP tunnel is set up; therefore, an X2 interface set up in this embodiment can be used to perform bidirectional data transmission, thereby implementing bidirectional data exchange between the secondary base station and the primary base station.

Figure 21:
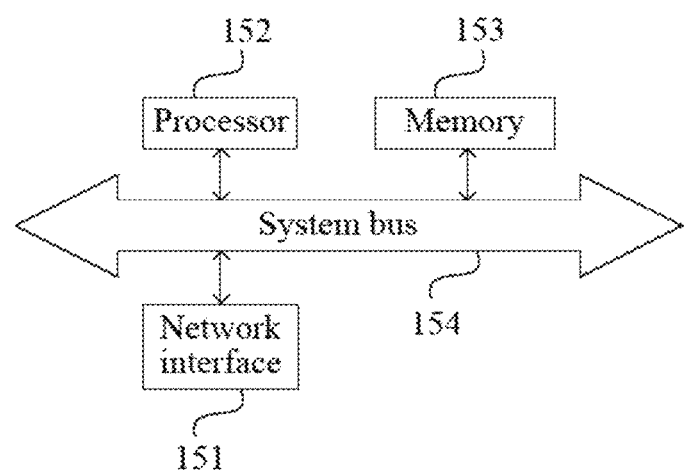
FIG. 21 is a schematic diagram of another data exchange apparatus according to a fifth embodiment of the present invention.

FIG. 21 is a schematic diagram of another data exchange apparatus according to a fifth embodiment of the present invention. The apparatus in this embodiment is a primary base station, and as shown in the figure, this embodiment includes a network interface 151, a processor 152, and a memory 153. Optionally, the apparatus further includes a system bus 154, configured to connect the network interface 151, the processor 152, and the memory 153. Optionally, the network interface 151 and the processor 152 are connected, and the processor 152 and the memory 153 are connected.

The network interface 151 is configured to communicate with an external device.

The memory 153 may be a permanent memory, for example, a hard disk drive and a flash memory, and the memory 153 has a software module and a device driver program. The software module can perform various functional modules in the foregoing methods of the present invention. The device driver program may be a network and interface driver program.

When being started, a software component, for example, the software module and/or the device driver program, is loaded to the memory 153, and is then accessed by the processor 152 and executes the following instructions:

an instruction used for sending a request of setting up an X3 interface to a secondary base station, where the X3 interface has a capability of bidirectional data communication;

an instruction used for receiving a response of setting up the X3 interface sent by the secondary base station; and an instruction used for performing bidirectional data exchange with the secondary base station by using the X3 interface; and the processor is configured to execute an application program.

Specifically, the request of setting up the X3 interface carries an inter-base station coordinated service identifier, and/or, the response of setting up the X3 interface carries an inter-base station coordinated service identifier. The X3 interface includes: an S1 interface.

Preferably, the application program further includes an instruction that may be used for enabling the processor and a system to perform the following process: sending, by the primary base station, an Internet Protocol (IP) address and a tunnel endpoint identifier (TED) of the primary base station to the secondary base station.

Preferably, the application program further includes: an instruction used for sending an Internet Protocol (IP) address and a tunnel endpoint identifier (TEID) of the primary base station to the secondary base station. The instruction used for performing bidirectional data exchange with the secondary base station by using the X3 interface includes: an instruction used for receiving uplink data that is sent by user equipment UE and forwarded by the secondary base station, and sending the uplink data to a serving gateway S-GW; and an instruction used for sending, to the secondary base station, downlink data sent by the S-GW, so that the secondary base station sends the downlink data to the UE.

Preferably, after the primary base station receives the response of setting up the X3 interface sent by the secondary base station, the application program further includes: an instruction used for sending a downlink transport network layer address TNL address and a General Packet Radio Service (GPRS) Tunneling Protocol (GTP) tunnel endpoint identifier (GTP TED) of the secondary base station to an S-GW by using a mobility management entity MME, and an instruction used for sending an uplink TNL address and a GTP TEID of the S-GW to the secondary base station, so that the secondary base station sends, to the S-GW, received uplink data sent by UE, and an instruction used for sending, to the UE, received downlink data sent by the S-GW.

For the data exchange apparatus in this embodiment, a primary base station sends a request of setting up an X3 interface, so that an X3 interface from the primary base station to a secondary base station can be set up, and the X3 interface may be implemented by an existing interface, for example, an S1 interface, or may be a newly defined interface having a capability of bidirectional data communication. Therefore, the X3 interface set up in this embodiment can be used to perform bidirectional data transmission, thereby implementing bidirectional data exchange between the primary base station and the secondary base station.

Figure 22:
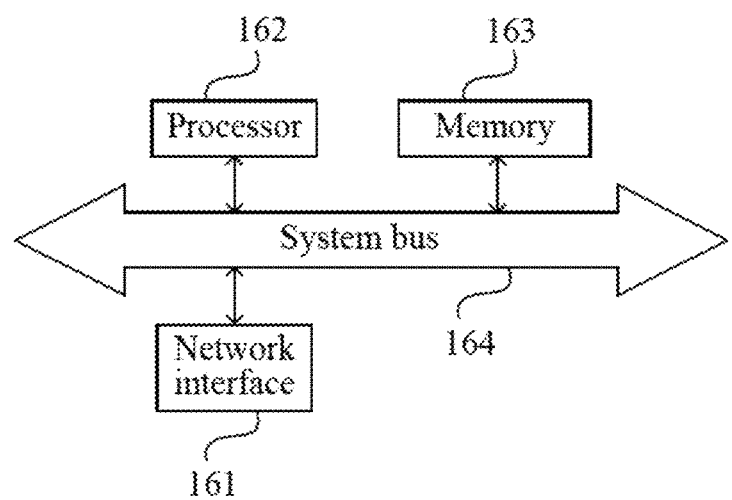
FIG. 22 is a schematic diagram of another data exchange apparatus according to a sixth embodiment of the present invention.

FIG. 22 is a schematic diagram of another data exchange apparatus according to a sixth embodiment of the present invention. The apparatus in this embodiment is a secondary base station, and as shown in the figure, the apparatus includes a network interface 161, a processor 162, and a memory 163. Optionally, the apparatus further includes a system bus 164, configured to connect the network interface 161, the processor 162, and the memory 163. Optionally, the network interface 161 and the processor 162 are connected, and the processor 162 and the memory 163 are connected.

The network interface 161 is configured to communicate with an external device.

The memory 163 may be a permanent memory, for example, a hard disk drive and a flash memory, and the memory 163 has a software module and a device driver program. The software module may include various functional modules that can perform the foregoing methods of the present invention. The device driver program may be a network and interface driver program.

When being started, a software component, for example, the software module and/or the device driver program, is loaded to the memory 163, and is then accessed by the processor 162 and executes the following instructions:

an instruction used for receiving a request of setting up an X3 interface sent by a primary base station, where the X3 interface has a capability of bidirectional data communication;

an instruction used for sending a response of setting up the X3 interface to the primary base station; and an instruction used for performing bidirectional data exchange with the primary base station by using the X3 interface; and the processor is configured to execute an application program.

Specifically, the request of setting up the X3 interface carries an inter-base station coordinated service identifier, and/or the response of setting up the X3 interface carries an inter-base station coordinated service identifier. The X3 interface includes: an S1 interface.

Preferably, the application program further includes an instruction that may be used for enabling the processor and a system to perform the following process: receiving an Internet Protocol IP address and a tunnel endpoint identifier TEID of the primary base station that are sent by the primary base station.

Preferably, the application program further includes an instruction used for receiving an Internet Protocol IP address and a tunnel endpoint identifier TED of the primary base station that are sent by the primary base station. The instruction used for performing bidirectional data exchange with the primary base station by using the X3 interface includes: an instruction used for sending, to the primary base station, uplink data from user equipment UE, so that the primary base station sends the uplink data to a serving gateway S-GW; and an instruction used for receiving downlink data that is from the S-GW and is sent by the primary base station, and sending the downlink data to the UE.

Preferably, the application program further includes: an instruction used for receiving an uplink transport network layer address TNL address and a General Packet Radio Service Tunneling Protocol tunnel endpoint identifier GTP TEID of an S-GW that are sent by the primary base station, sending, to the S-GW, received uplink data sent by the UE, and sending, to the UE, received downlink data from the S-GW.

For the data exchange apparatus in this embodiment, a secondary base station receives a request of setting up an X3 interface sent by a primary base station, so that an X3 interface from the secondary base station to the primary base station can be set up, and the X3 interface may be implemented by an existing interface, for example, an S1 interface, or may be a newly defined interface having a capability of bidirectional data communication. Therefore, the X3 interface set up in this embodiment can be used to perform bidirectional data transmission, thereby implementing bidirectional data exchange between the secondary base station and the primary base station.

Figure 23:
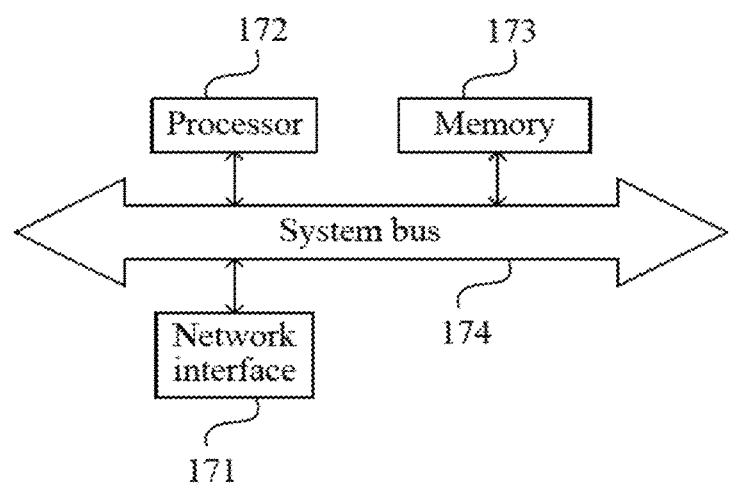
FIG. 23 is a schematic diagram of another data exchange apparatus according to a seventh embodiment of the present invention.

FIG. 23 is a schematic diagram of another data exchange apparatus according to a seventh embodiment of the present invention. The apparatus in this embodiment is a mobility management entity MME, and as shown in the figure, this embodiment includes a network interface 171, a processor 172, and a memory 173. Optionally, the apparatus further includes a system bus 174, configured to connect the network interface 171, the processor 172, and the memory 173. Optionally, the network interface 171 and the processor 172 are connected, and the processor 172 and the memory 173 are connected.

The network interface 171 is configured to communicate with an external device.

The memory 173 may be a permanent memory, for example, a hard disk drive and a flash memory, and the memory 173 has a software module and a device driver program. The software module can perform various functional modules in the foregoing methods of the present invention. The device driver program may be a network and interface driver program.

When being started, a software component, for example, the software module and/or the device driver program, is loaded to the memory 173, and is then accessed by the processor 172 and executes the following instructions:

an instruction used for receiving a first message sent by a primary base station, where the first message is used for requesting a secondary base station to collaborate with the primary base station to serve user equipment UE;

an instruction used for sending a second message to the secondary base station, where the second message is used for requesting the secondary base station to collaborate with the primary base station to serve the UE;

an instruction used for receiving a first response returned by the secondary base station, where the first response carries information that the secondary base station agrees to collaborate with the primary base station to serve the UE; and an instruction used for sending a second response to the primary base station, so that the primary base station and the secondary base station work together to serve the UE; and the processor is configured to execute an application program.

Preferably, the application program further includes an instruction used for notifying a serving gateway S-GW corresponding to the UE of address information of the secondary base station, and notifying the secondary base station of address information of the S-GW, so that the secondary base station performs data exchange with the S-GW for the UE. The address information of the secondary base station includes: a transport network layer address TNL address and a General Packet Radio Service Tunneling Protocol tunnel endpoint identifier GTP-TEID of the secondary base station, and the address information of the S-GW includes: a TNL address and a GTP-TEID of the S-GW.

For the data exchange apparatus in this embodiment, a network element MME of a core network is used to assist in data exchange, thereby implementing that a primary base station and a secondary base station work together to serve UE. The secondary base station is used to directly perform data transmission with an S-GW, so that for an inter-base station coordinated service, different base stations may serve different bearers, thereby improving service quality for UE. Existing messages are reused to the maximum degree.

Figure 24:
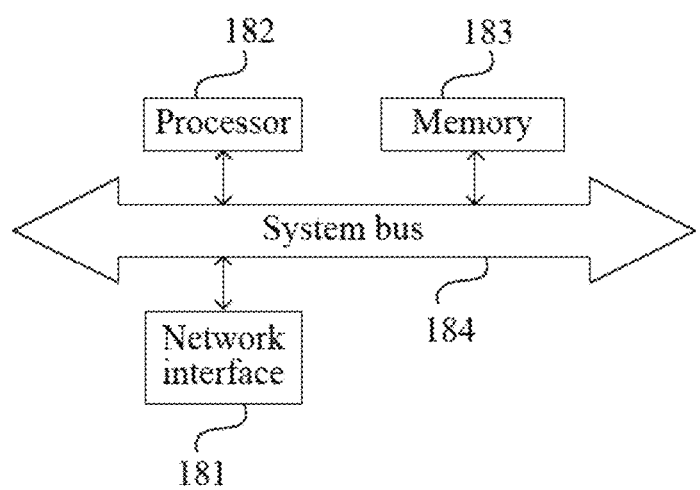
FIG. 24 is a schematic diagram of another data exchange apparatus according to an eighth embodiment of the present invention.

FIG. 24 is a schematic diagram of another data exchange apparatus according to an eighth embodiment of the present invention. The apparatus in this embodiment is a secondary base station, and as shown in the figure, this embodiment includes a network interface 181, a processor 182, and a memory 183. Optionally, the apparatus further includes a system bus 184, configured to connect the network interface 181, the processor 182, and the memory 183. Optionally, the network interface 181 and the processor 182 are connected, and the processor 182 and the memory 183 are connected.

The network interface 181 is configured to communicate with an external device.

The memory 183 may be a permanent memory, for example, a hard disk drive and a flash memory, and the memory 183 has a software module and a device driver program. The software module can perform various functional modules in the foregoing methods of the present invention. The device driver program may be a network and interface driver program.

When being started, a software component, for example, the software module and/or the device driver program, is loaded to the memory 183, and is then accessed by the processor 182 and executes the following instructions:

an instruction used for receiving a second message sent by a mobility management entity MME, where the second message is used for requesting the secondary base station to collaborate with a primary base station to serve user equipment UE; and an instruction used for sending a first response to the MME, where the first response carries information that the secondary base station agrees to collaborate with the primary base station to serve the UE, so that the MME sends a second response to the primary base station, and the second response is used for notifying that the primary base station works together with the secondary base station to serve the UE; and the processor is configured to execute an application program.

Preferably, after the secondary base station sends the first response to the MME, the application program further includes: an instruction used for receiving address information, sent by the MME, of a serving gateway S-GW corresponding to the UE; and an instruction used for performing, according to the address information of the S-GW, data exchange with the S-GW for the UE. The address information of the S-GW includes: a transport network layer address TNL address and a General Packet Radio Service (GPRS) Tunneling Protocol (GTP) tunnel endpoint identifier (GTP-TEID) of the S-GW.

Preferably, the instruction used for performing, according to the address information of the S-GW, data exchange with the S-GW for the UE includes: an instruction used for sending, to the S-GW, received uplink data from the UE, and sending, to the UE, received downlink data from the S-GW.

For the data exchange apparatus in this embodiment, a network element MME of a core network is used to assist in data exchange, thereby implementing that a primary base station and a secondary base station work together to serve UE. The secondary base station is used to directly perform data transmission with an S-GW, so that for an inter-base station coordinated service, different base stations may serve different bearers, thereby improving service quality for UE. Existing messages are reused to the maximum degree.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or a storage medium in any other forms well known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A data exchange apparatus, comprising:
a transmitter configured to send, to a secondary base station, a request for setting up an interface that is capable of bidirectional signaling communication;
a receiver configured to receive a response for setting up the interface from the secondary base station; and
a processor coupled to the receiver and the transmitter and configured to perform bidirectional signaling exchange with the secondary base station using the interface,
wherein the transmitter is further configured to:
send a downlink transport network layer (TNL) address and a General Packet Radio Service Tunneling Protocol tunnel endpoint identifier (GTP TEID) of the secondary base station to a user plane entity using a mobility management entity (MME); and
send an uplink TNL address and a GTP TEID of the user plane entity to the secondary base station.

2. A data exchange apparatus, comprising:
a receiver configured to receive, from a primary base station, a request for setting up an interface that is capable of bidirectional signaling communication;
a transmitter configured to send a response for setting up the interface to the primary base station; and
a processor coupled to the receiver and the transmitter and configured to perform bidirectional signaling exchange with the primary base station using the interface,
wherein the receiver is further configured to:
receive an uplink transport network layer (TNL) address and a General Packet Radio Service Tunneling Protocol tunnel endpoint identifier (GTP TEID) of a user plane entity sent by the primary base station, and
wherein the transmitter is further configured to:
send, to the user plane entity, received uplink data from a user equipment (UE); and
send, to the UE, received downlink data from the user plane entity.

3. A data exchange method, comprising:
sending, by a primary base station to a secondary base station, a request for setting up an interface that is capable of bidirectional data communication;
receiving, by the primary base station, a response for setting up the interface from the secondary base station;
transmitting, by the primary base station, a first internet protocol (IP) address and a first General Packet Radio Service Tunneling Protocol tunnel endpoint identifier (GTP TEID) of the primary base station to the secondary base station;
transmitting, by the primary base station, a second IP address and a second GTP TEID of the primary base station to a user plane entity;
receiving, by the primary base station, uplink data according to the first IP address and the first GTP TEID; and
receiving, by the primary base station, downlink data according to the second IP address and the second GTP TEID.

4. The method of claim 3, wherein after receiving, by the primary base station, the uplink data according to the first IP address and the first GTP TEID, the method further comprises transmitting, by the primary base station, the uplink data to the user plane entity.

5. The method of claim 3, wherein after receiving, by the primary base station, the downlink data according to the second IP address and the second GTP TEID, the method further comprises transmitting, by the primary base station, the downlink data to the secondary base station.

6. The method claim 4, wherein after receiving, by the primary base station, the downlink data according to the second IP address and the second GTP TEID, the method further comprises transmitting, by the primary base station, the downlink data to the secondary base station.

7. A data exchange apparatus, comprising:
a transmitter configured to:
send, to a secondary base station, a request for setting up an interface that is capable of bidirectional data communication;
transmit a first internet protocol (IP) address and a first General Packet Radio Service Tunneling Protocol tunnel endpoint identifier (GTP TEID) of a primary base station to the secondary base station; and
transmit a second IP address and a second GTP TEID of the primary base station to a user plane entity; and
a receiver coupled to the transmitter and configured to:
receive a response for setting up the interface from the secondary base station;
receive uplink data according to the first IP address and the first GTP TEID; and
receive downlink data according to the second IP address and the second GTP TEID.

8. The apparatus of claim 7, wherein the transmitter is further configured to transmit the uplink data to the user plane entity.

9. The apparatus of claim 7, wherein the transmitter is further configured to transmit the downlink data to the secondary base station.

10. A data exchange method, comprising:
sending, to a secondary base station, a request for setting up an interface that is capable of bidirectional signaling communication;
receiving a response for setting up the interface from the secondary base station;

sending a downlink transport network layer (TNL) address and a General Packet Radio Service Tunneling Protocol tunnel endpoint identifier (GTP TEID) of the secondary base station to a user plane entity using a mobility management entity (MME);

sending an uplink TNL address and a GTP TEID of the user plane entity to the secondary base station; and performing bidirectional signaling exchange with the secondary base station using the interface.

11. A data exchange method, comprising:

receiving, from a primary base station, a request for setting up an interface that is capable of bidirectional signaling communication;

sending a response for setting up the interface to the primary base station;

receiving an uplink transport network layer (TNL) address and a General Packet Radio Service Tunneling Protocol tunnel endpoint identifier (GTP TEID) of a user plane entity from the primary base station;

sending, to the user plane entity, received uplink data from a user equipment (UE);

sending, to the UE, received downlink data from the user plane entity; and performing bidirectional signaling exchange with the primary base station using the interface.

12. The method of claim 11, wherein the method is implemented by a secondary base station.

13. The method of claim 12, further comprising the secondary base station working together with the primary base station to simultaneously provide service for the UE.

14. The data exchange apparatus of claim 1, wherein the request for setting up the interface comprises an inter-base station coordinated service identifier.

15. The data exchange apparatus of claim 14, wherein the response for setting up the interface comprises the inter-base station coordinated service identifier.

16. The data exchange apparatus of claim 1, wherein the response for setting up the interface comprises an inter-base station coordinated service identifier.

17. The data exchange apparatus of claim 2, wherein the request for setting up the interface comprises an inter-base station coordinated service identifier.

18. The data exchange apparatus of claim 17, wherein the response for setting up the interface comprises the inter-base station coordinated service identifier.

19. The data exchange apparatus of claim 2, wherein the response for setting up the interface comprises an inter-base station coordinated service identifier.

* * * * *